Jan. 3, 1939.　　　E. BREITLING ET AL　　　2,142,346
ACCOUNTING OR THE LIKE MACHINE
Filed April 3, 1935　　　23 Sheets-Sheet 1

Inventors
Ernst Breitling
Hans Schwenk

Jan. 3, 1939.  E. BREITLING ET AL  2,142,346
ACCOUNTING OR THE LIKE MACHINE
Filed April 3, 1935  23 Sheets-Sheet 5

Inventors
Ernst Breitling
Hans Schwenk

Jan. 3, 1939.  E. BREITLING ET AL  2,142,346
ACCOUNTING OR THE LIKE MACHINE
Filed April 3, 1935   23 Sheets-Sheet 6

Inventors
Ernst Breitling
Hans Schwenk

Jan. 3, 1939.  E. BREITLING ET AL  2,142,346
ACCOUNTING OR THE LIKE MACHINE
Filed April 3, 1935   23 Sheets-Sheet 7

Inventors
Emmett Breitling
Hans Schwenk

Jan. 3, 1939. E. BREITLING ET AL 2,142,346
ACCOUNTING OR THE LIKE MACHINE
Filed April 3, 1935  23 Sheets-Sheet 8
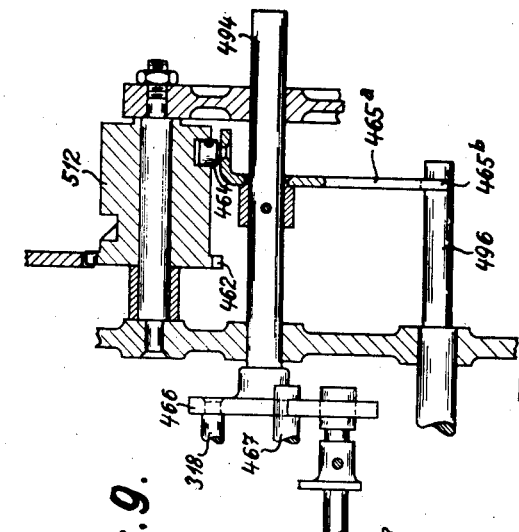
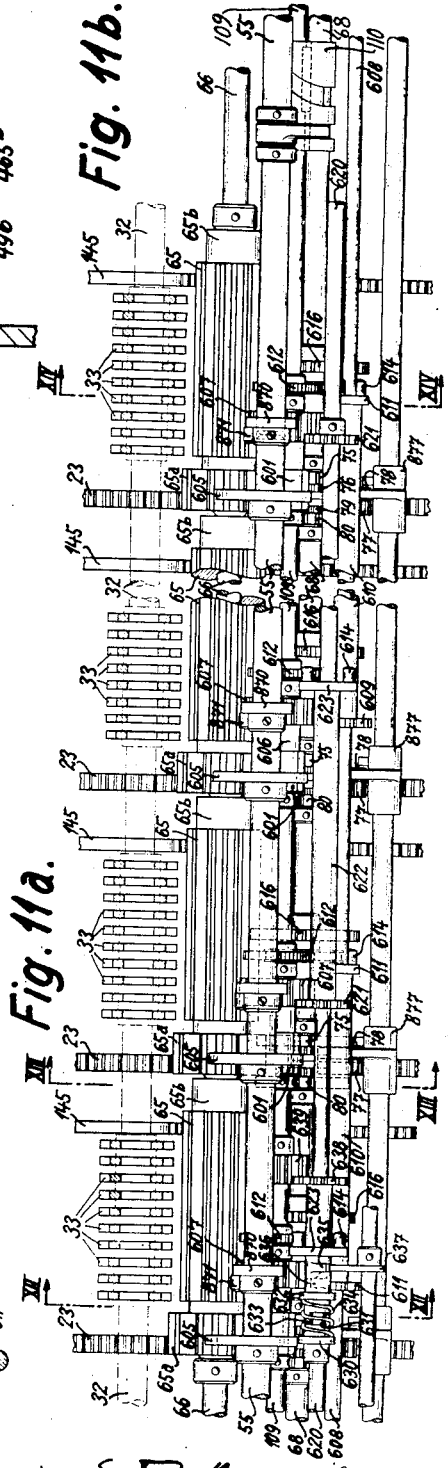
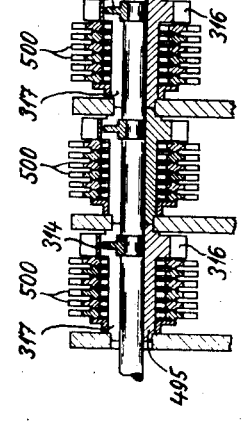
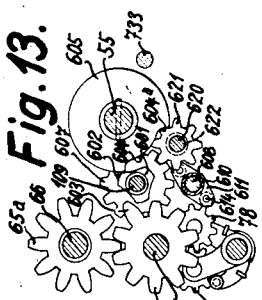
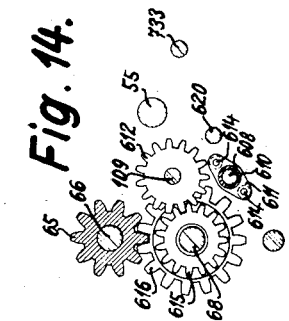
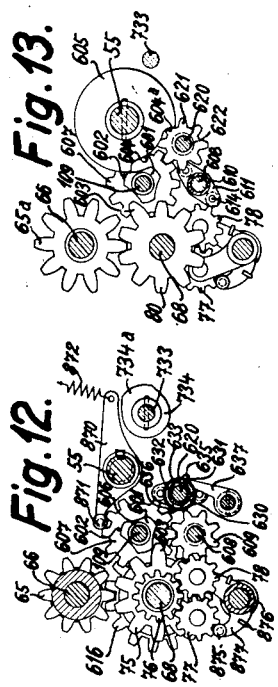
Inventors Ernst Breitling Hans Schwenk Jan. 3, 1939.   E. BREITLING ET AL   2,142,346
ACCOUNTING OR THE LIKE MACHINE
Filed April 3, 1935   23 Sheets-Sheet 10
Fig. 17.
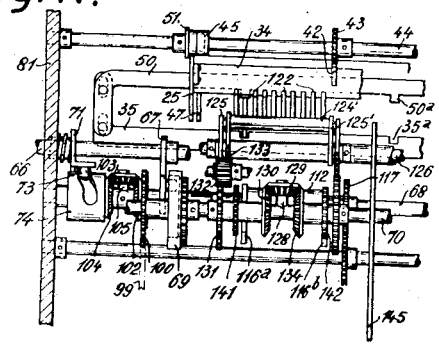
Fig. 18.
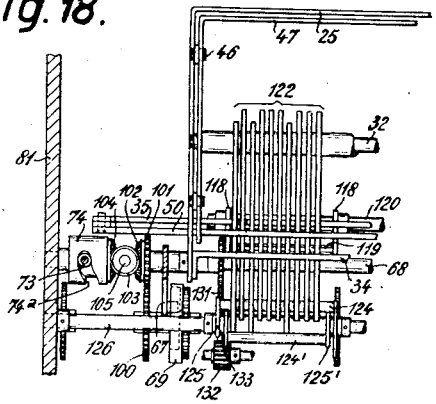
Fig. 19.
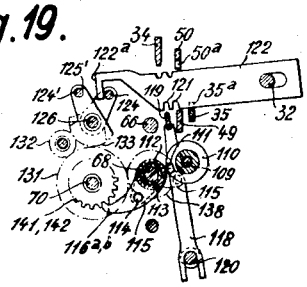
Fig. 20.   Fig. 21.
Fig. 15
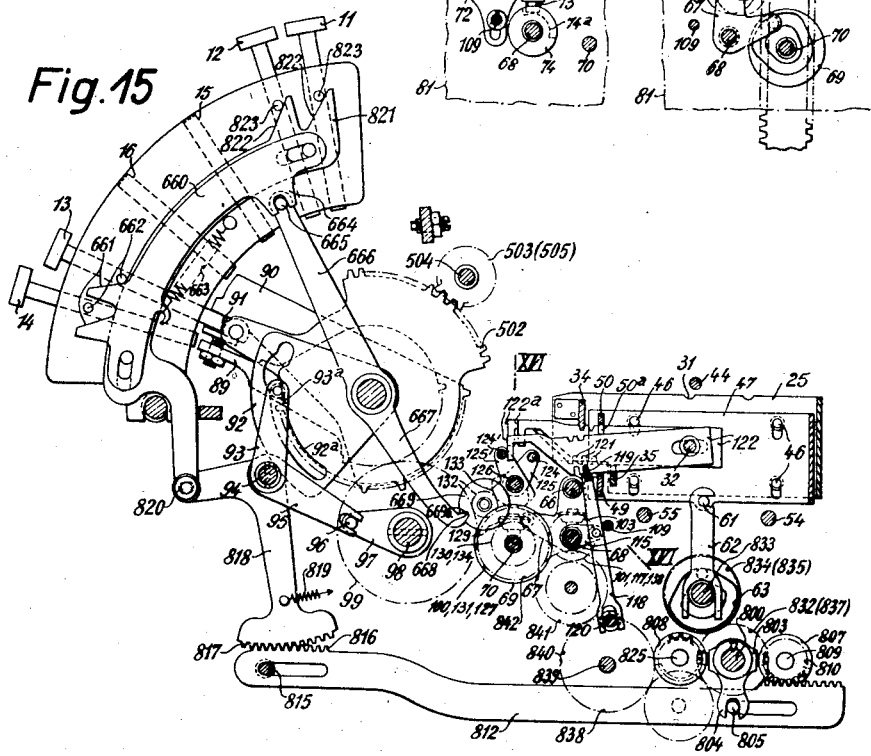
Inventors
Ernst Breitling
Hans Schwenk.

Jan. 3, 1939.  E. BREITLING ET AL  2,142,346
ACCOUNTING OR THE LIKE MACHINE
Filed April 3, 1935   23 Sheets-Sheet 11
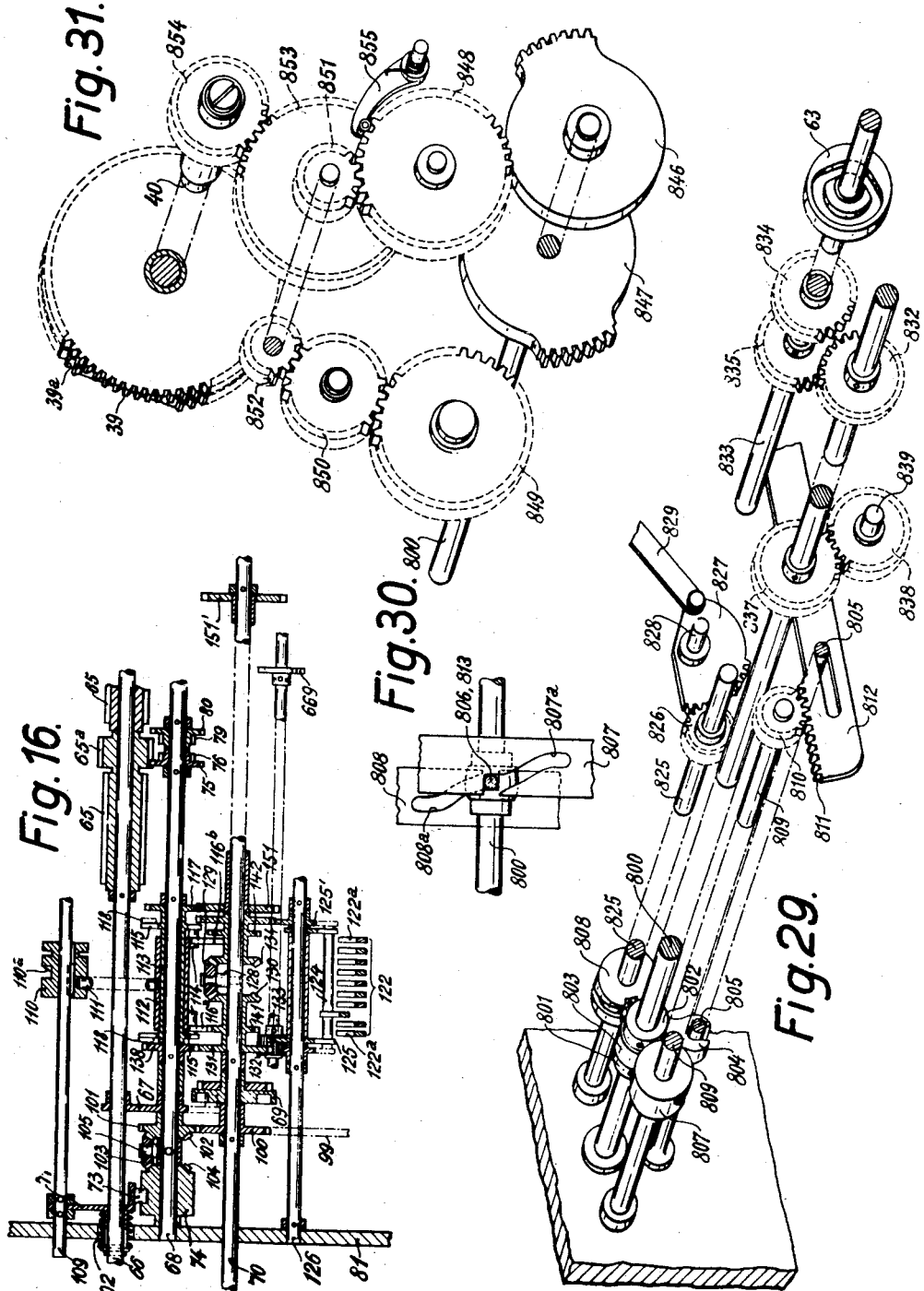
Inventors

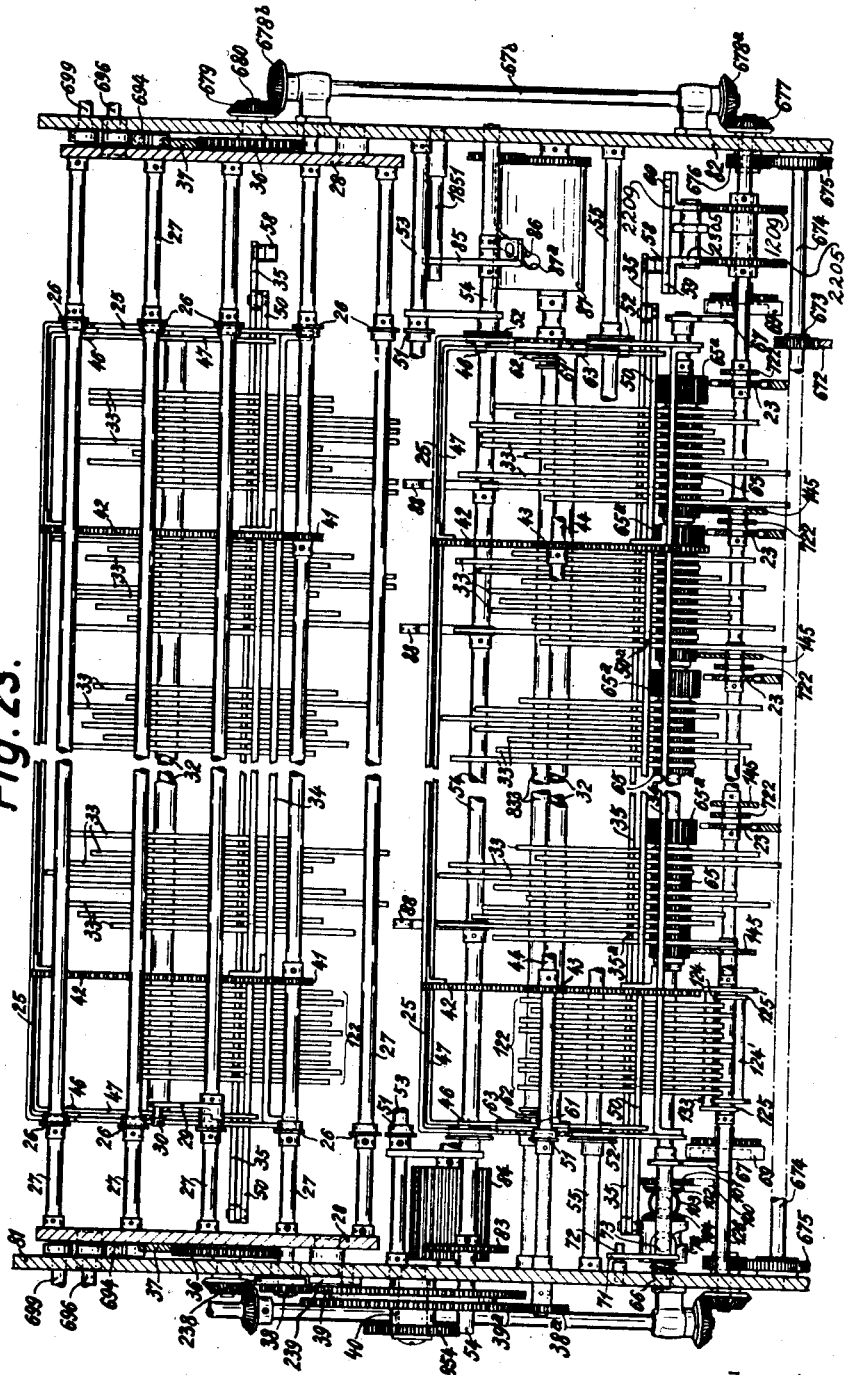

Jan. 3, 1939.  E. BREITLING ET AL  2,142,346
ACCOUNTING OR THE LIKE MACHINE
Filed April 3, 1935   23 Sheets-Sheet 14
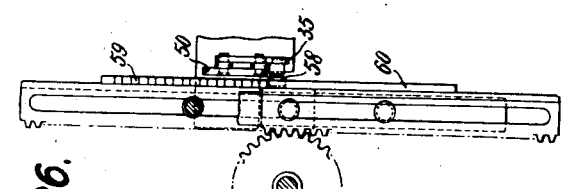
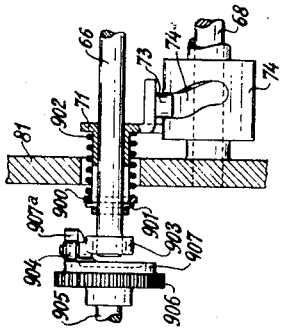
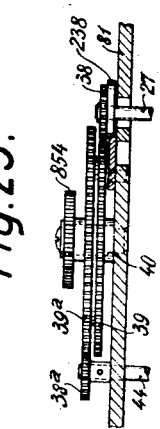
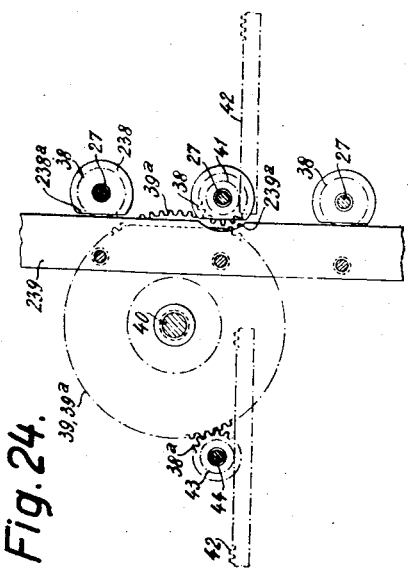
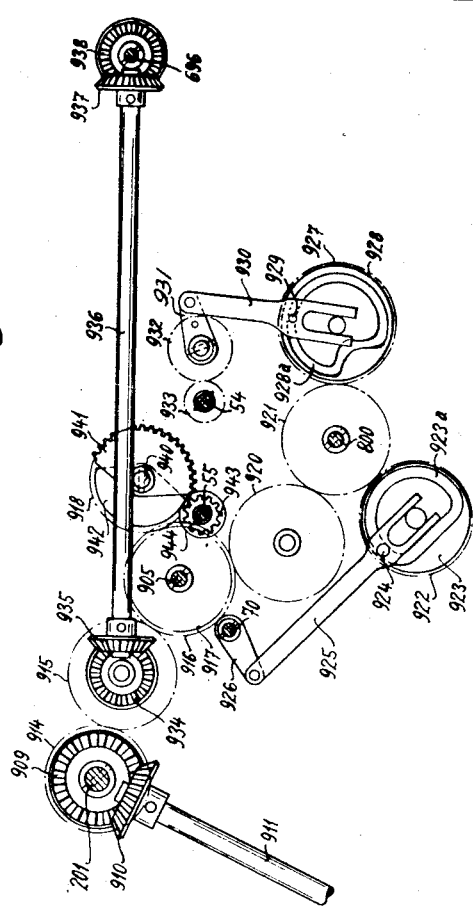
Inventors
Ernst Breitling
Hans Schwenk

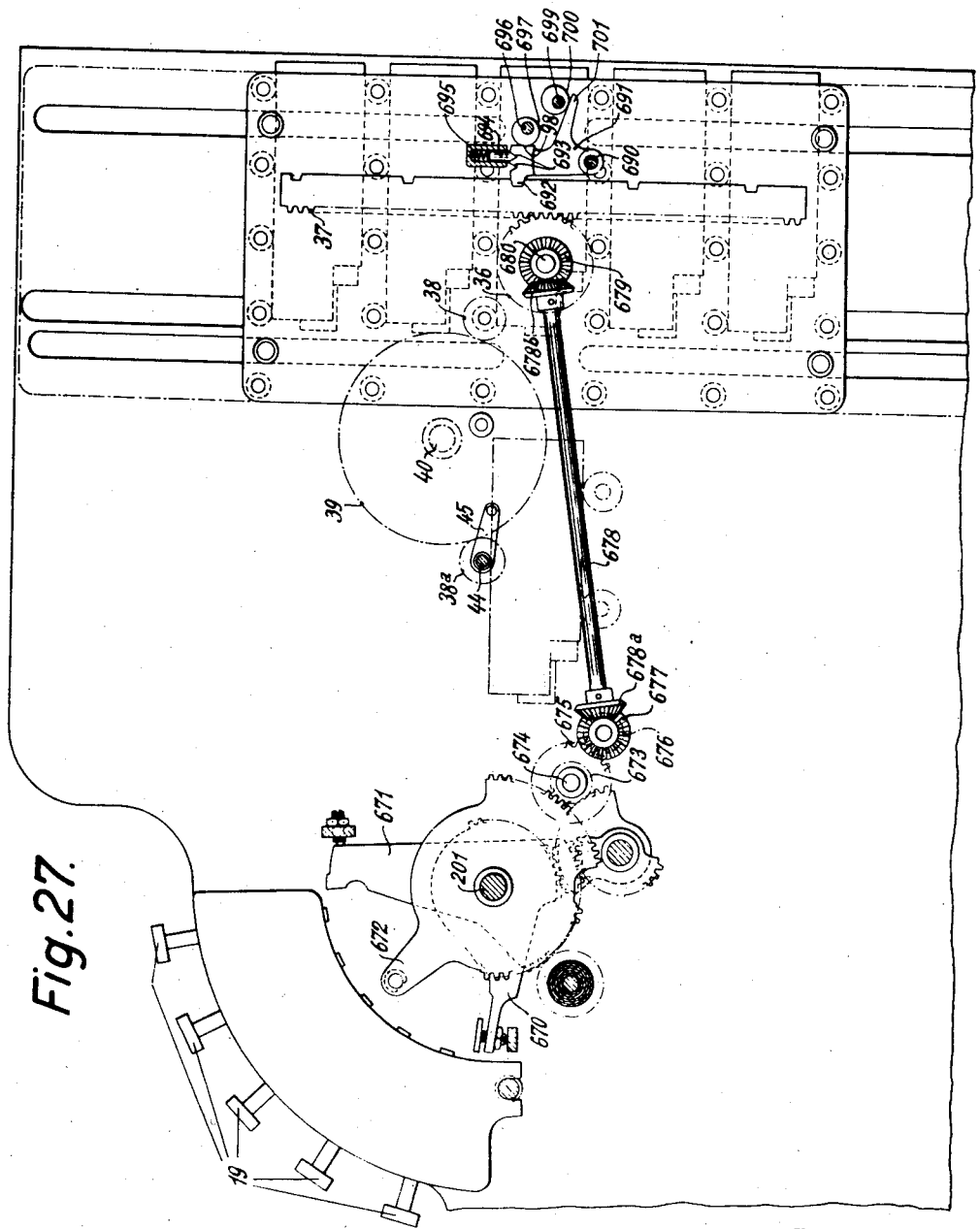

Jan. 3, 1939.    E. BREITLING ET AL    2,142,346
ACCOUNTING OR THE LIKE MACHINE
Filed April 3, 1935    23 Sheets-Sheet 16

Inventors
Ernst Breitling and
Hans Schwenk
By Carl Beust
Their Attorney

Jan. 3, 1939. E. BREITLING ET AL 2,142,346
ACCOUNTING OR THE LIKE MACHINE
Filed April 3, 1935 23 Sheets-Sheet 17

Inventors
Ernst Breitling and
Hans Schwenk
By Carl Benst
Their Attorney

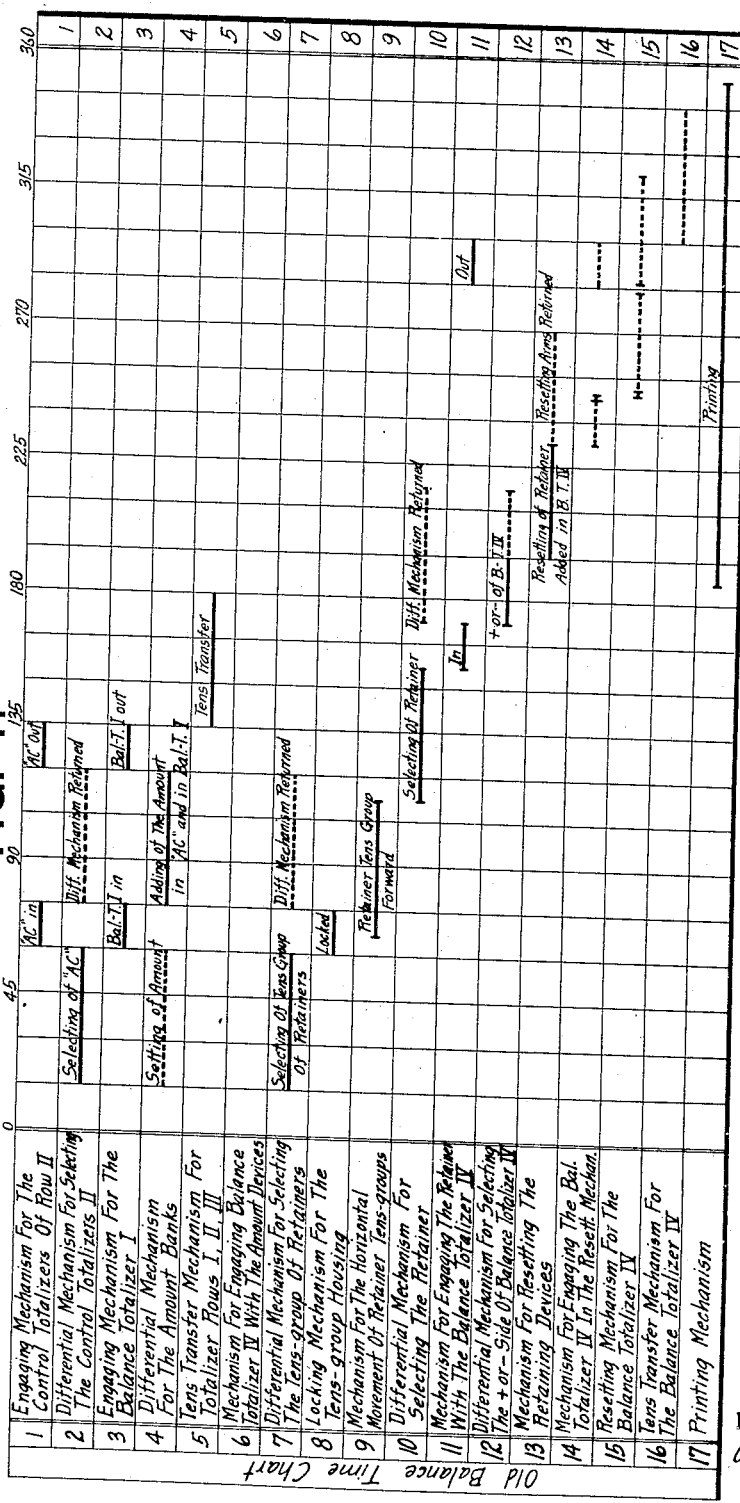

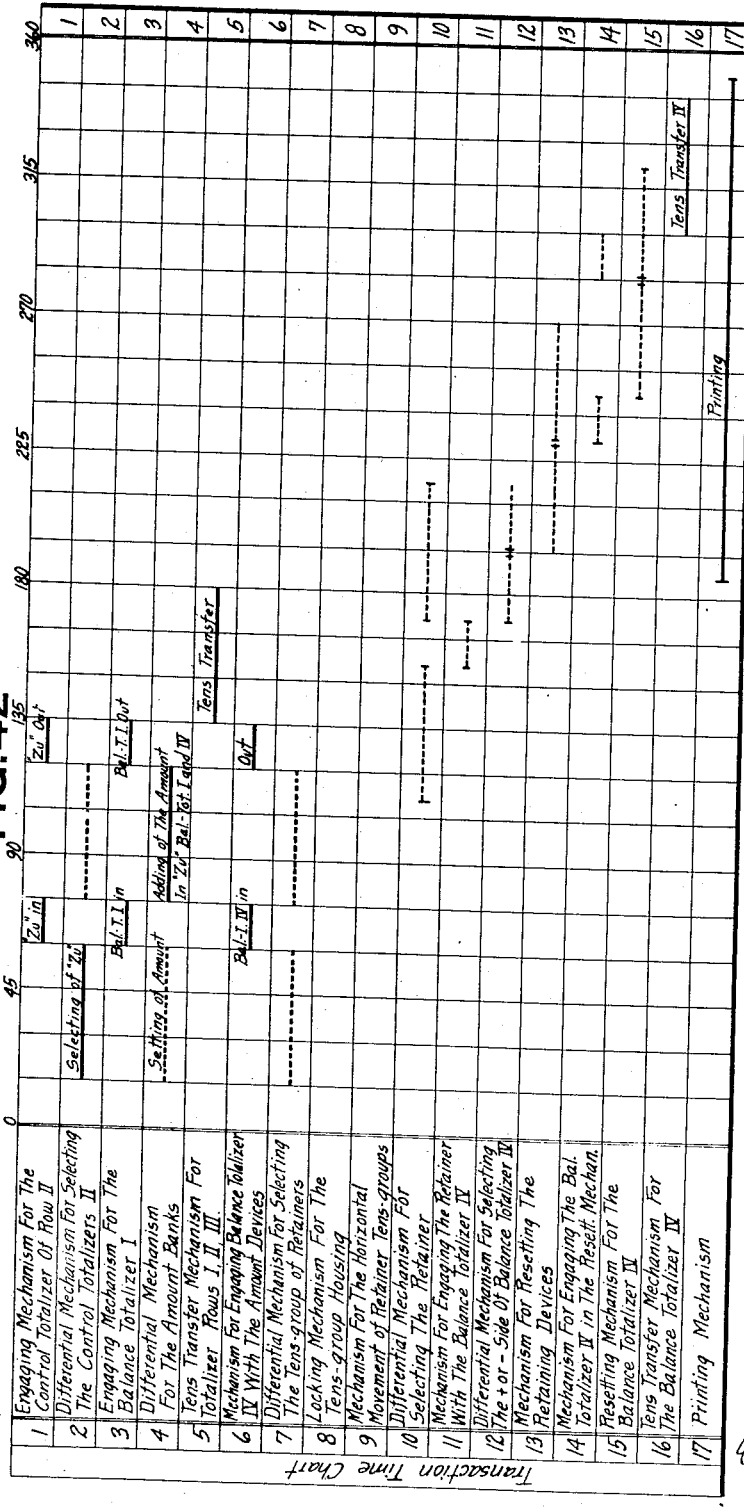

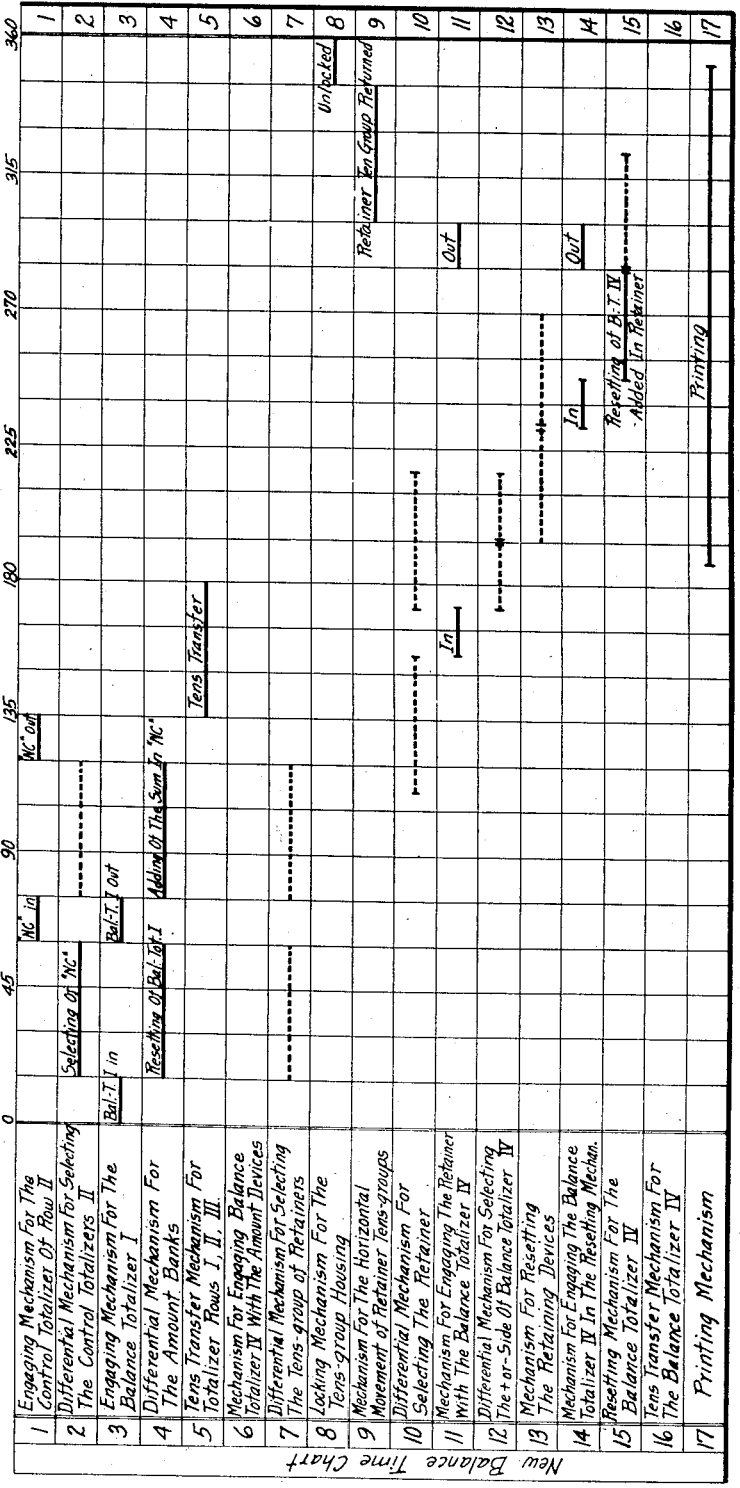

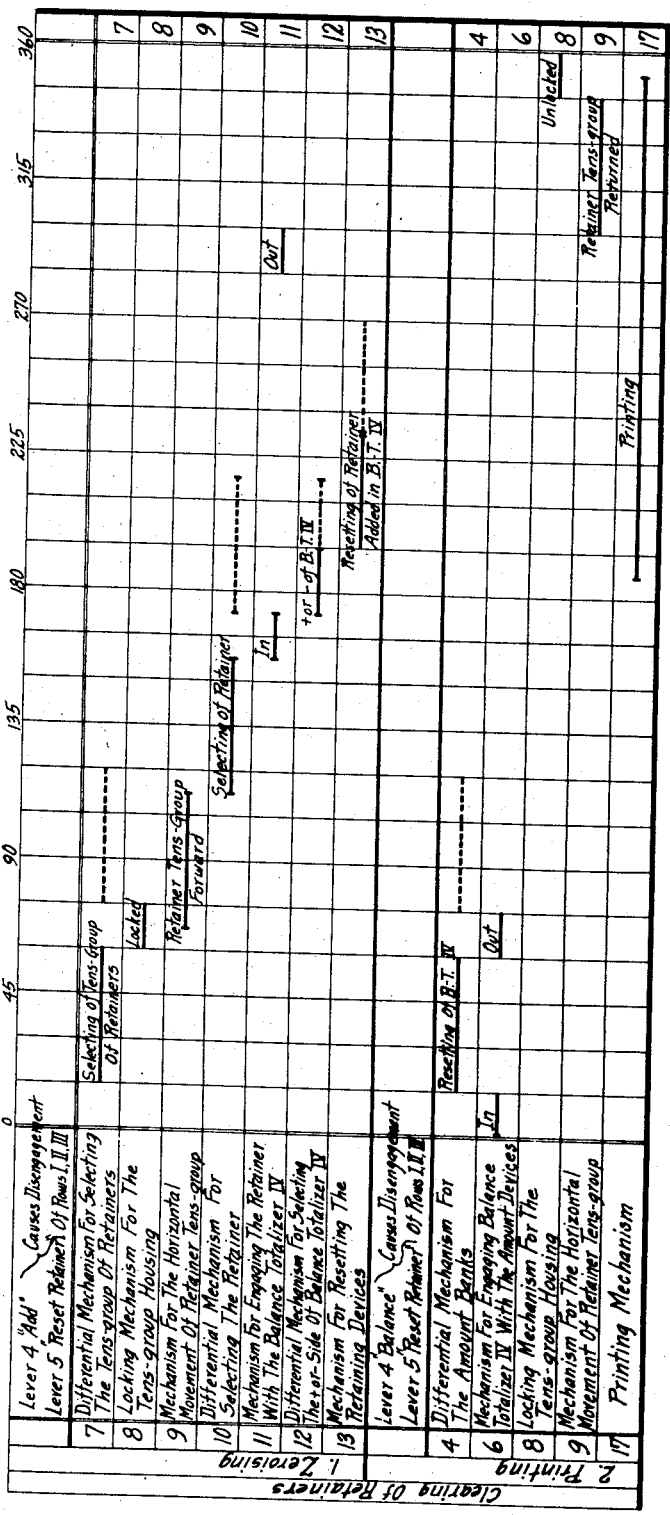

Jan. 3, 1939.  E. BREITLING ET AL  2,142,346
ACCOUNTING OR THE LIKE MACHINE
Filed April 3, 1935      23 Sheets-Sheet 23
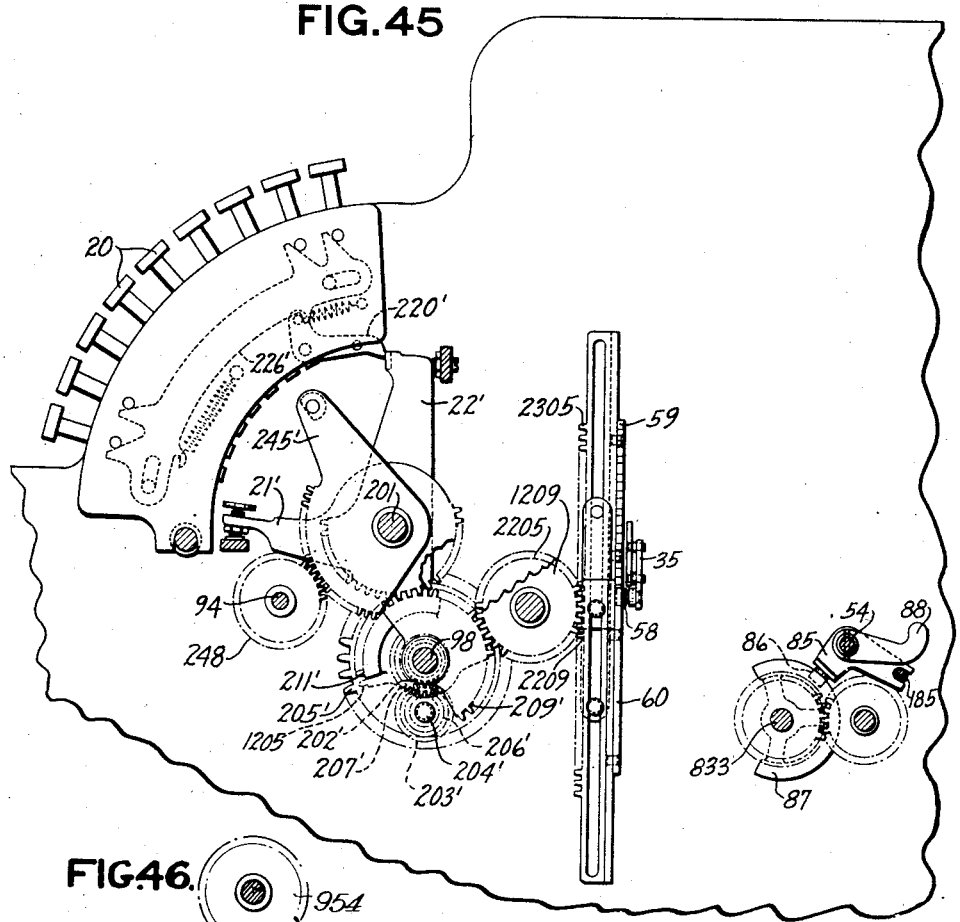
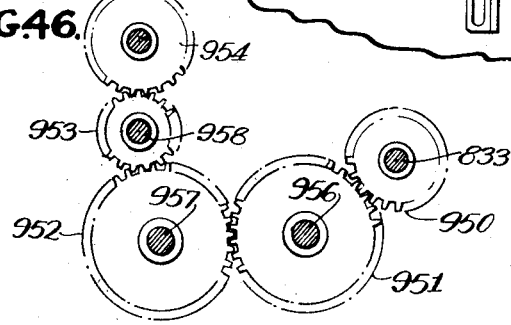
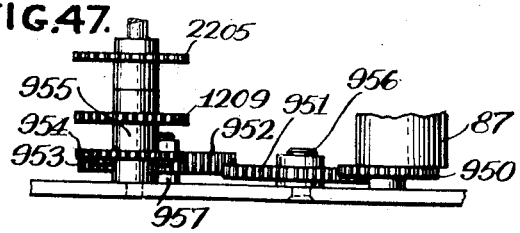
Inventors
Ernst Breitling and
Hans Schwenk
By
Their Attorney Patented Jan. 3, 1939

2,142,346

UNITED STATES PATENT OFFICE 2,142,346

ACCOUNTING OR THE LIKE MACHINE

Ernst Breitling and Hans Schwenk, Berlin, Germany, assignors to The National Cash Register Company, Dayton, Ohio, a corporation of Maryland Application April 3, 1935, Serial No. 14,506
In Germany April 6, 1934

14 Claims. (Cl. 235—6)

The invention relates to accounting and the like machines, and more particularly to machines provided with several rows of totalizers and/or retaining devices with which at least one add and subtract totalizer is cooperating for and in balancing operations.

The main object of the invention is to adapt such retaining devices for signifying any amount standing thereon according to its sign.

Another object of the invention is to provide means to actuate the signifying means according to the sign of totals computed by, and transferred from, an add and subtract totalizer to any of the retaining devices.

Another object of the invention is to provide means cooperating with the retaining devices for selecting the add or subtract wheels of the add and subtract totalizer according to the sign of totals accumulated on the retaining devices, in adding, subtracting and totaling operations.

Another object of the invention is to provide means to select one of the several rows of retaining devices arranged thereon in interspersed denominational order, and one of said retaining devices of the selected row, and to bring it in cooperative relation with an add and subtract totalizer.

Another object of the invention is to arrange, in addition to the add and subtract totalizer cooperating with the retaining devices, several rows of totalizers of which at least one row contains an add and subtract totalizer.

Another object of the invention is to provide control means for entering amounts, set up on the key board simultaneously, into several add and subtract totalizers while other classes of amount set up are transferred to only one add and subtract totalizer.

Another object of the invention is to provide control means for entering an amount (old balance) set up on the key board into one add and subtract totalizer, while an amount standing on a retaining device is simultaneously transferred to another add and subtract totalizer.

Still further objects of the invention will be pointed out in the following detailed description with reference to the annexed drawings.

In said drawings:

Fig. 1 is a perspective view of the entire machine,

Figs. 2a and 2b taken together constitute a section through the machine alongside of an amount key bank, Figs. 3a and 3b are longitudinal sections through the adding and subtracting totalizer I, Fig. 4 is a cross section through the adding and subtracting totalizer I along line IV—IV of Fig. 3a, Fig. 5 is a cross section through the adding and subtracting totalizer along line V—V of Fig. 3a, Figs. 6 and 7 show side elevations of the locking means of the "fugitive one" transfer mechanism of the adding and subtracting totalizer, Fig. 8 shows a side view of the motor key operated selecting mechanism of the adding and subtracting wheels of the adding and subtracting totalizer I, Fig. 9 is a cross section of the selecting device for the auxiliary totalizers, Fig. 10 is a side elevation of the selecting device for the itemizer and parts of the mode of operation control mechanism, Fig. 10a is an elevation showing certain parts of Fig. 10 in front elevation.

Figs. 11a and 11b are rear views of parts of the add and subtract totalizer,

Fig. 12 is a section along line XII—XII of Fig. 11a,

Fig. 13 is a section along line XIII—XIII of Fig. 11a,

Fig. 14 is a section along XIV—XIV of Fig. 11b,

Figure 22:
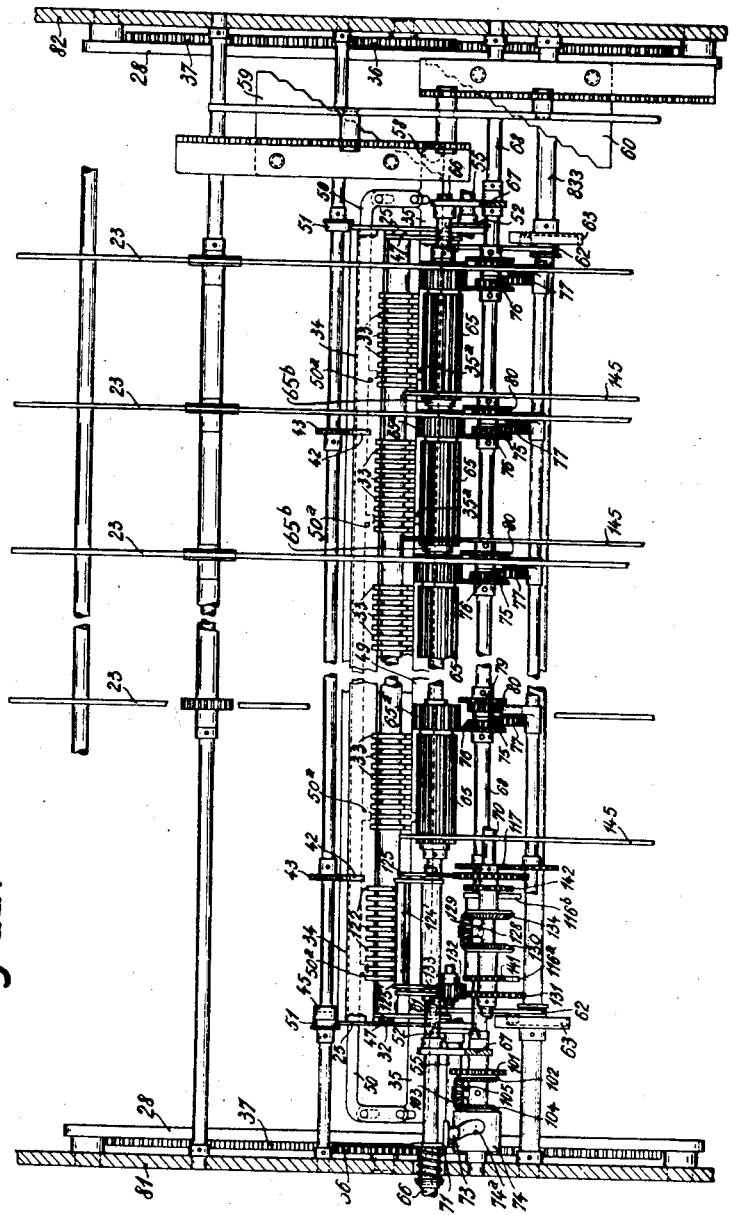

Fig. 15 is a side elevation of the auxiliary totalizers key bank with parts of the selecting device of the add and subtract wheels of the add and subtract totalizer IV, Fig. 16 is a section along line XVI—XVI of Fig. 15, Fig. 17 is a front view of the selecting device as per Fig. 15, Fig. 18 is a top view of the selecting device as per Fig. 15, Fig. 19 shows the arrangement of some parts of the selecting device as per Fig. 15 when a new balance is taken, Fig. 20 is a side view of the shifting device and Fig. 21 is a side view of the engaging device of the add and subtract totalizer IV, Fig. 22 is a front view of the add and subtract totalizer IV and of the retaining devices, Fig. 23 is a top view of the retaining devices, Fig. 24 is a side view and Fig. 25 is a top view of shifting mechanism for the retaining device, Fig. 26 is a side view of the selector for the retaining devices of one group, Fig. 27 shows in a side elevation the drive of the retaining device housing.

Figure 28:
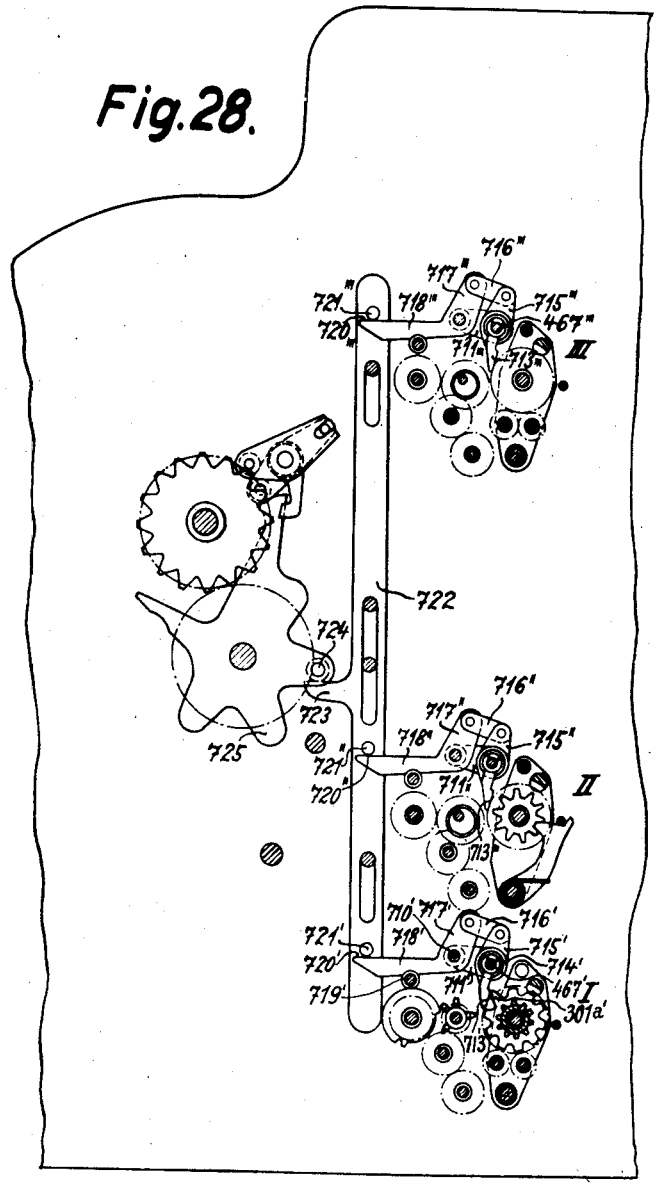

Fig. 28 shows a side elevation of a portion of the total taking device for the totalizer rows I to III, Fig. 29 is a partial perspective rear view of the mode of operation control mechanism, Fig. 30 is a diagrammatic view of two cam grooves, Fig. 31 is a perspective view of the drive for the retaining device groups advancing mechanism as seen from the rear, Fig. 32 a side view, partly in section, of a device for additionally shifting the coupling pinions, Fig. 33 shows in front view the drive for the locking means of the retainer housing.

Figure 2A:
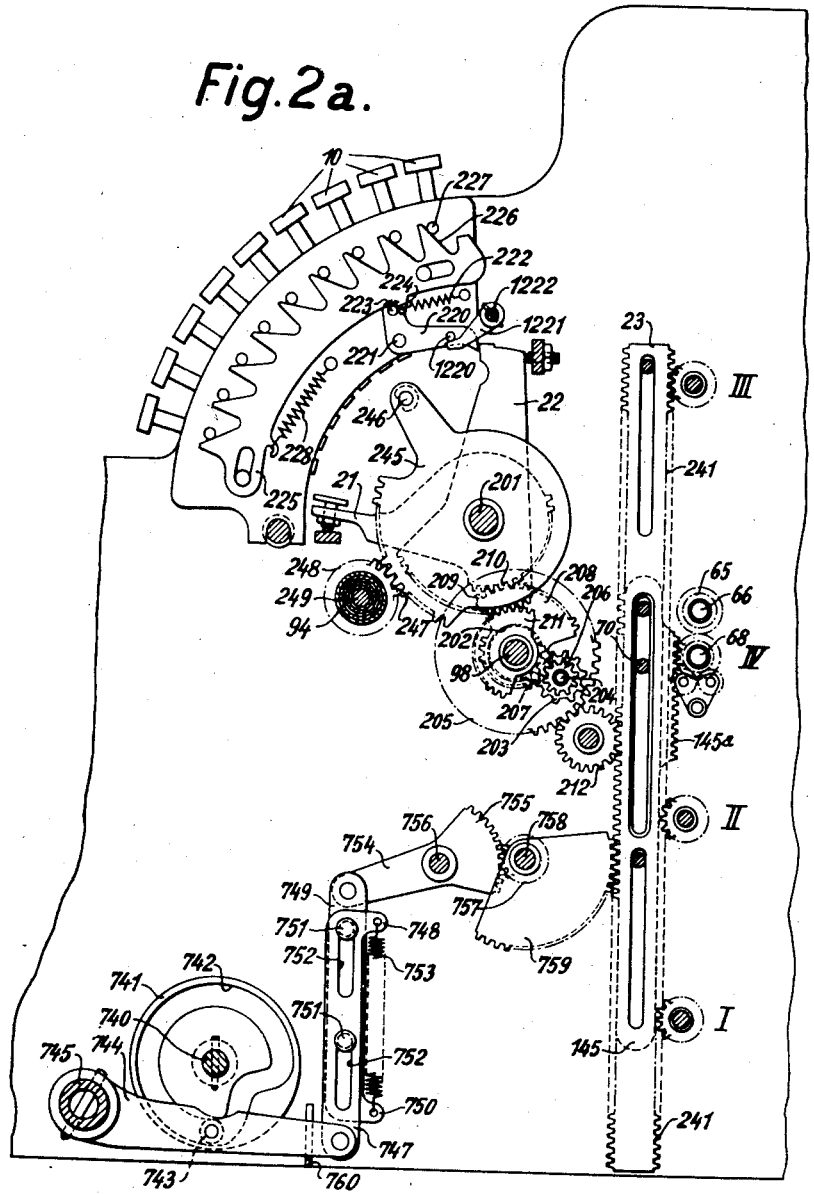
Figure 2B:
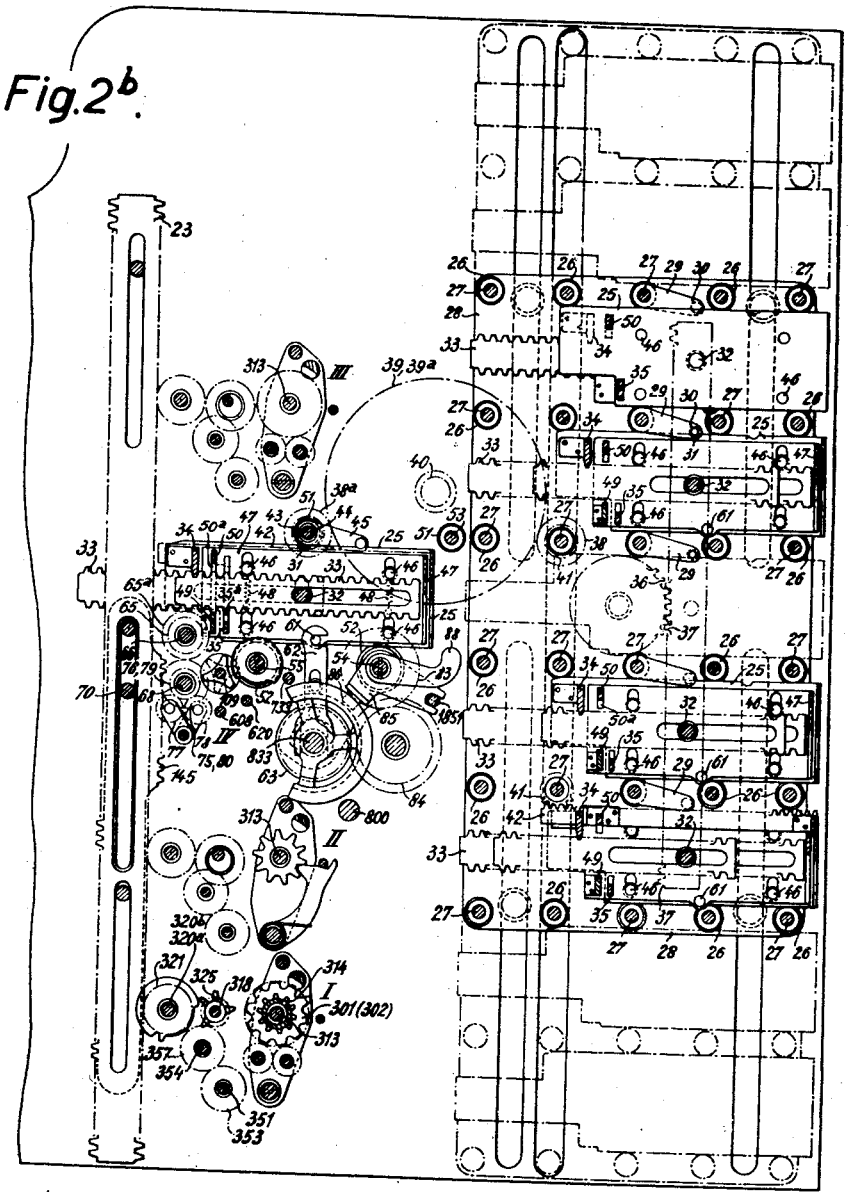
Figure 34:
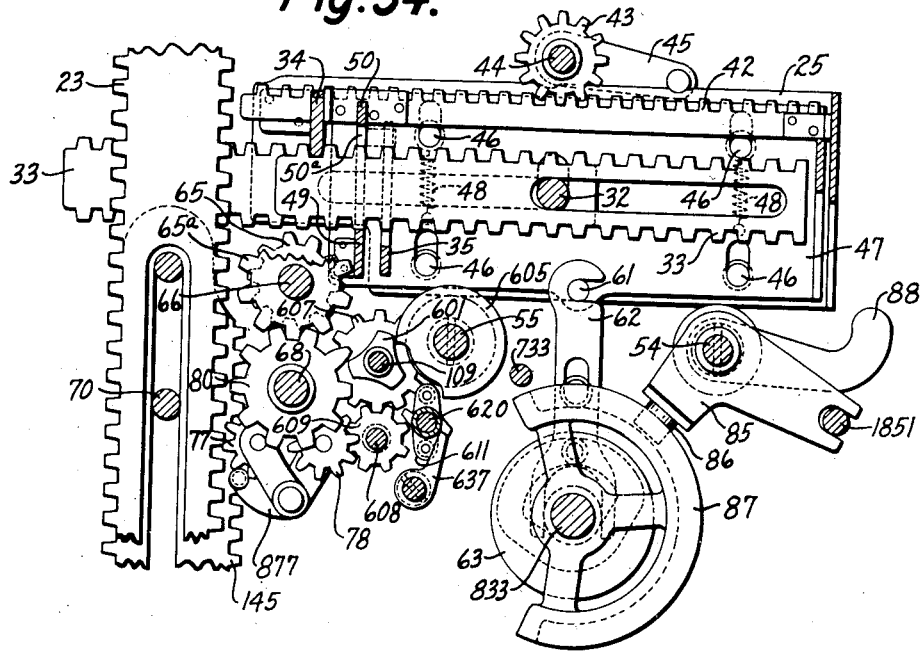

Fig. 34 is an enlarged detail view showing a part of the mechanism illustrated in Fig. 2b.

Figure 35:
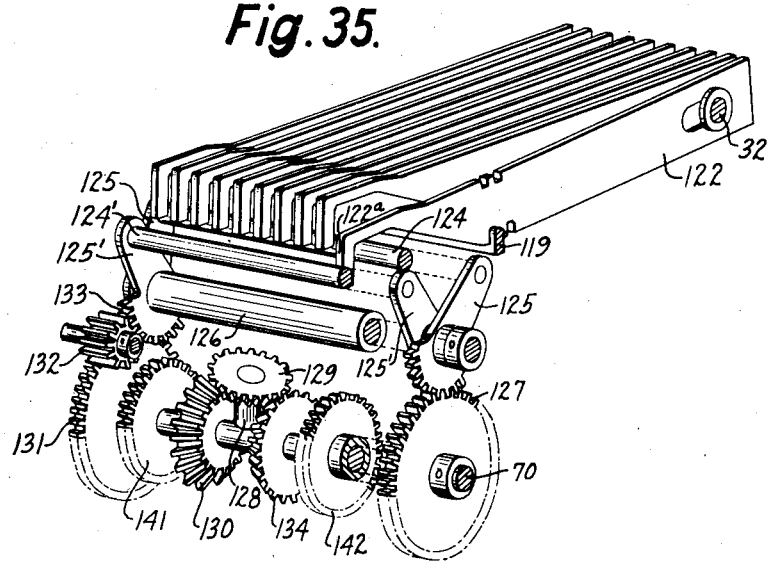

Fig. 35 is a detail view, in perspective, showing differential means for setting the retaining devices, and the means whereby the retaining devices control the differential means.

Figure 36:
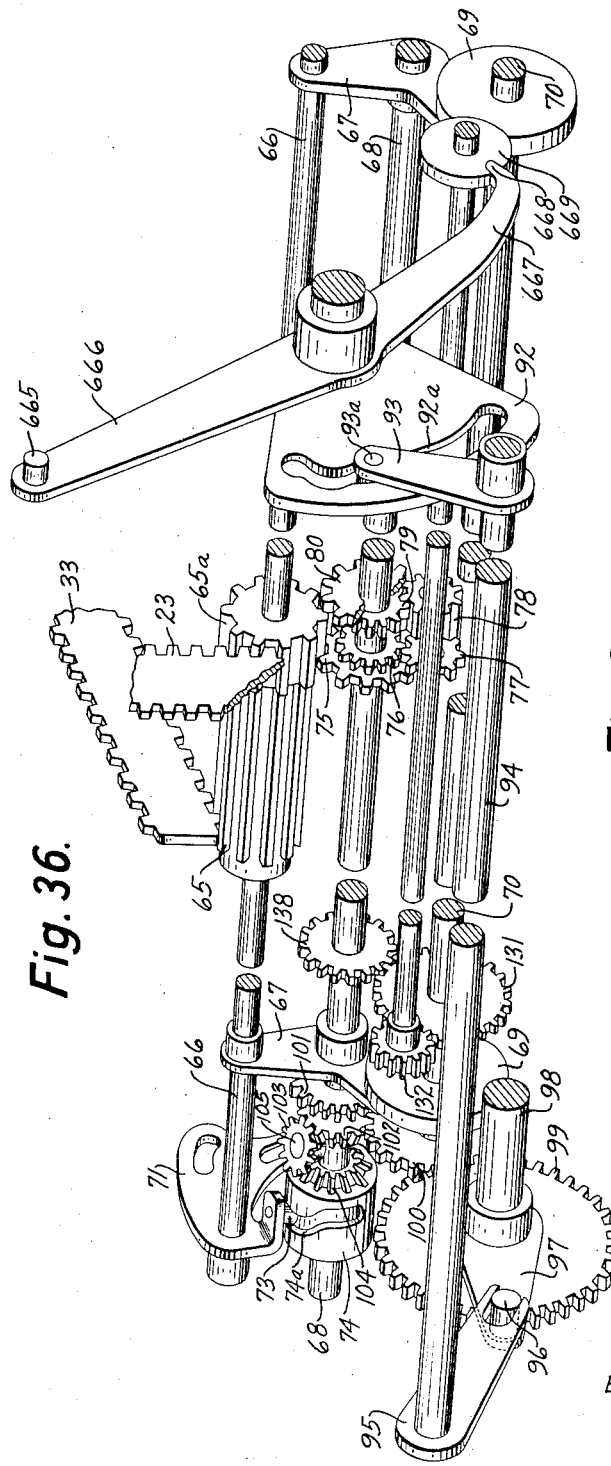

Fig. 36 is an enlarged detail view, in perspective, of a part of the mechanism shown in Fig. 15.

Figure 37:
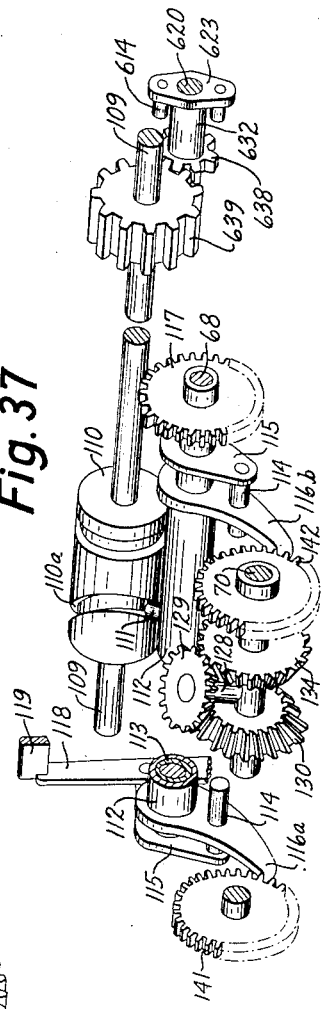

Fig. 37 is an enlarged detail view, in perspective, of some of the mechanism shown in Figs. 16 and 17.

Figure 38:
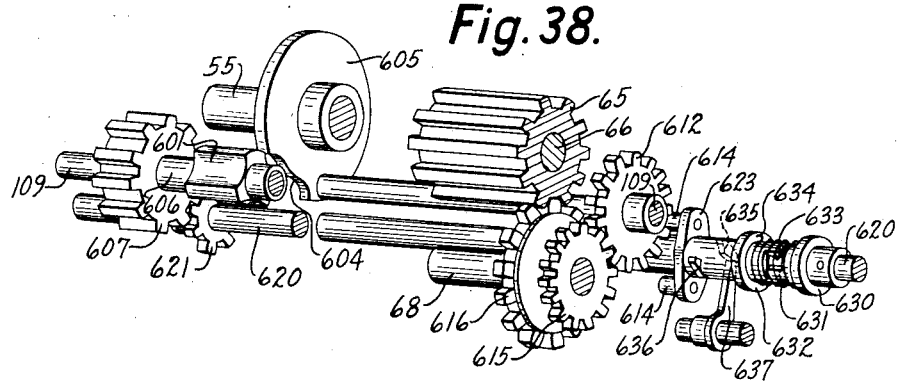
Figure 39:
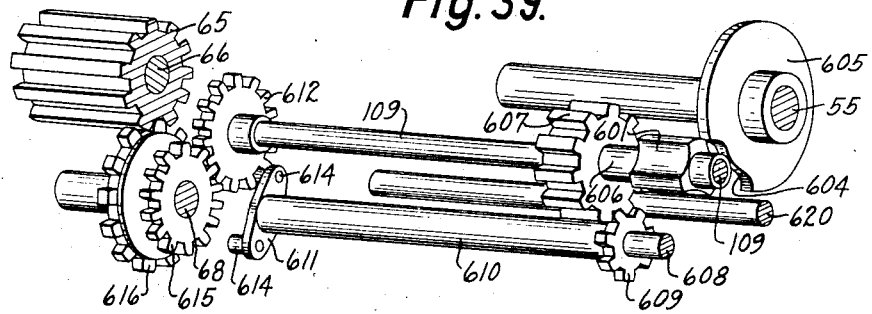
Figure 40:
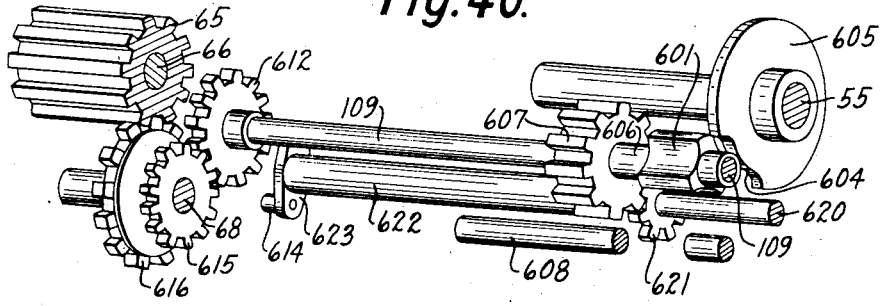

Figs. 38, 39, and 40 are detail views, in perspective, showing the transfer mechanisms.

Figs. 41, 42, 43, and 44 are time charts of the machine and show the time of operation of the various mechanisms when conditioned for the four different kinds of operations.

Fig. 45 is a cross sectional view showing the control bank and certain mechanism set under control thereof.

Fig. 46 is a detail view showing the driving connections between the differential of Fig. 45 and the drum cam for selecting retaining members.

Fig. 47 is a plan view of the mechanism shown in Fig. 46.

GENERAL DESCRIPTION

The machine according to the present invention is adapted to be used in various businesses, but particularly as will be described hereinafter, in a savings bank. In such an establishment an account is provided for each customer, the state of which account is to be seen from an account (pass) book handed the customer, as well as from an account (ledger) card reading like said book and kept by the savings bank. If a depositor makes a deposit to the favor of his account, the last balance is read from the ledger card, as well as the account number and so on, which are then entered by the clerk into the machine as the old balance. A key for the selection of the totalizer "AC" is depressed, in which totalizer the old credit balances are accumulated for certain auditing purposes. The machine is released for operation by a motor key, whereupon the old balance is entered into the said auxiliary totalizer AC and into an add and subtract totalizer.

Thereafter the amount of the deposit is set up and a key for the selection of an auxiliary totalizer "Zu" is depressed, in which totalizer all the deposits are accumulated. During the machine operation the deposit is entered into this totalizer and, in addition thereto, added to the old balance standing on the add and subtract totalizer, thus creating the new balance. Finally, the total is taken from the add and subtract totalizer and transferred to a totalizer for the new credit balances. All these operations are printed on the account (ledger) card, pass (account) book and an audit strip in any manner, well known in the art and, therefore, not detailed hereinafter. The negative balances, that is, for instance, the old debit balances, the withdrawals, and the new debit balances are also entered on or taken from, respectively, the respective auxiliary totalizer and, additionally, the subtract wheels of the add and subtract totalizer.

The amount deposited or withdrawn by the customer is recorded not only on the customer account represented by the account card, but also on a transaction account, for instance, a "cash" account represented by a retaining device. The retaining devices are located within the machine, and are selected by means of special keys when the old balances are entered. During these operations of the machine, independently of the beforementioned operations, the selected retaining device is reset and its total transferred to a second add and subtract totalizer, that is, to the add or subtract wheels, according to whether the old balance on the retaining device was a positive or a negative one. In so doing, the sign of the amount on the retaining device is determined by means of a special device.

The deposits, or withdrawals, entered during the second operation of the machine, are transferred to the add or subtract wheels respectively of each of the two add and subtract totalizers. Then, while in the last machine operation the new balance of the customer account is taken by resetting the first add and subtract totalizer, also the second add and subtract totalizer is reset and the new balance of the transaction account is transferred back again to the retainer, whereat also the now valid sign, of the amount on the retainer is automatically set. Thus, with the present machine, two different balancing operations can be performed at the same time, in connection with which the amount of the deposit, or withdrawal, is alike whereas the old and the new balance are different from each other.

SETTING BOARD

Figure 1:
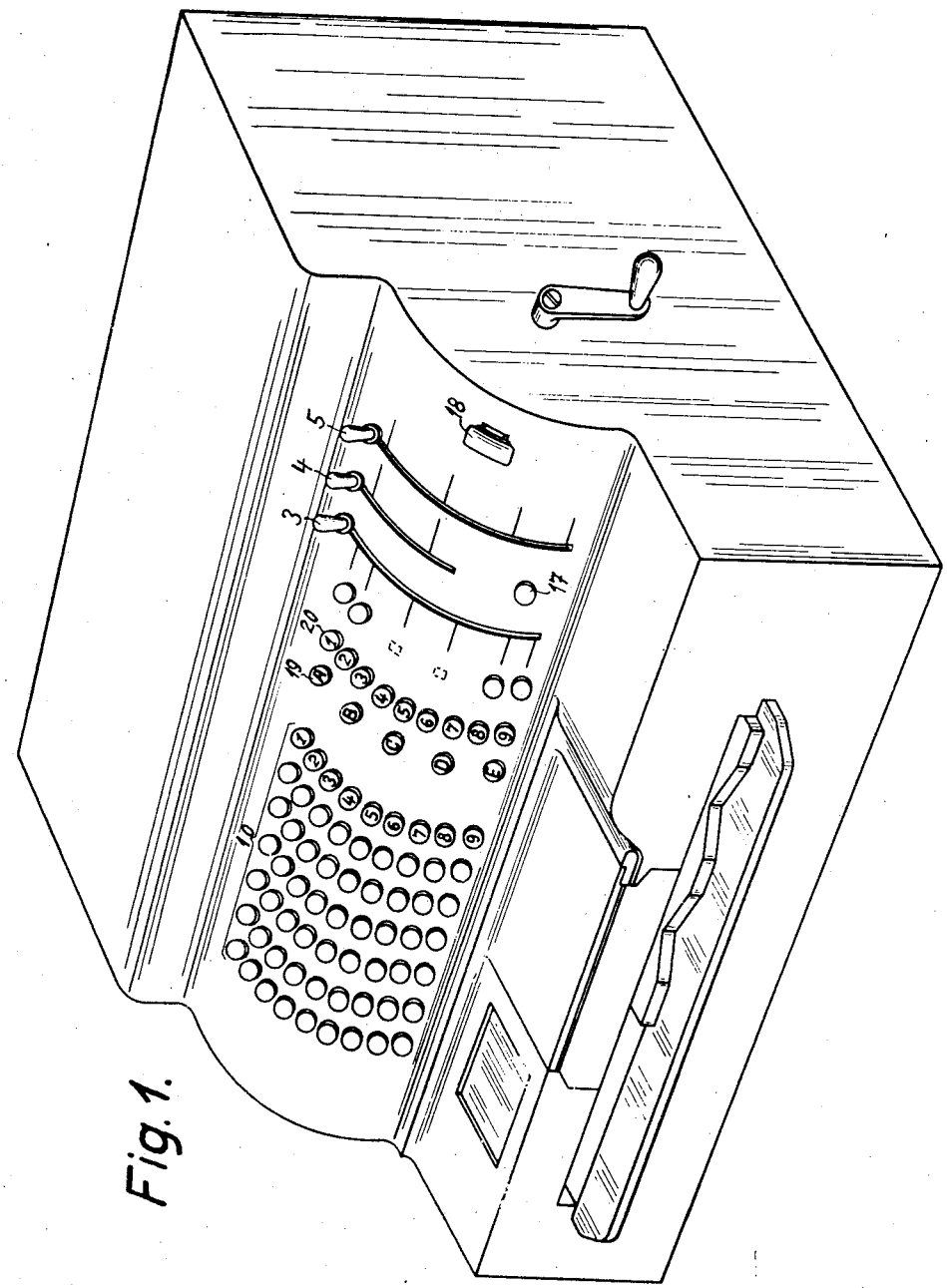

In the present machine the key board is provided with seven amount key banks 10 (Fig. 1), two key banks for the selection of retaining devices, the keys of said two banks being subdivided in group keys 19, and unit keys 20. Further, a key bank for the selection of the auxiliary totalizers in which bank, at the top, the keys 11 and 12 for the old credit and debit balances; in the center, the keys 15 and 16, being only stems, for the new credit and debit balances; and below the latter, the keys 13, 14 for the deposits and withdrawals are arranged. Next to the auxiliary totalizer keys there is arranged a totalizer lever 3 for the selection of the auxiliary totalizers at total taking. Next thereto is a balance lever 4 controlling, when set to "add" or "balance", the mode of operation of the machine. A lever 5 when positioned to "duplicate", "add", "read", and "reset", controls the mode of operation of the totalizers. Further, a key 17 is provided for engaging the multiple item totalizer, and a release key 18 releasing the machine and switching the motor.

AMOUNT DIFFERENTIAL DEVICE

The amount differential device is constructed similarly to that disclosed in the U. S. A. Patent No. 1,899,455, and therefore it will be described hereinafter only briefly. In each key bank there are provided two differential members 21, 22 loosely mounted on a shaft 201 (Fig. 2a). A pinion 202 secured to a drive shaft 98 meshes with a gear 203 on a stud 204 of a differential wheel 205 loosely mounted on the shaft 98. Rigidly connected with the gear 203 is a pinion 206 meshing with teeth 207 of a segment 208 loosely arranged on the shaft 98. The other teeth 209 of the segment 208 mesh with teeth 210 of the auxiliary differential member 21. The main differential member 22 is in engagement with a segment 211 rigidly connected to the differential wheel 205. Thus a differential gearing is constituted, the planetary wheels 203, 206 of which are, through the gear 205, connected with the main differential member 22, whereas its differential gears 202, 208 are connected with the drive shaft 98 and the auxiliary differential member 21.

In each machine operation the shaft 98 performs a reciprocal movement which, by means of the said differential device, is converted in such a manner that the two differential members are, first, advanced in a scissors-like way to the foot of the respective key 10 depressed, and, thereupon, restored to their normal positions. In so doing, the main differential member 22 moves by a number of steps corresponding to the value of the depressed key, which movement, through the segment 211, the differential gear 205, and an intermediate gear 212, is transferred to an amount differential rack 23 moved, first, upwardly, in accordance with the main differential member, and, then, being restored to its normal position. The amount differential racks 23 are provided with a set of teeth 241 alined with each totalizer group (Figs. 2a, 2b) and enabled to be brought in mesh with the wheels of the respective totalizers as will be described later on.

If no key 10 is depressed, the main differential member 22 is retained by means of a zero stop pawl 220, in its normal, or "0" position. The zero stop pawl 220 is arranged on a stationary pin 221 and provided with a pin 223 engaging under the action of a spring 222 a projection 224 of a detent 225. The detent 225 is provided with cam surfaces 226 enabled to cooperate with pins 227 of the keys 10, said detent being normally held, by a spring 228, in its upper position. Upon depression of a key 10 the detent 225 is lowered, thereby moving the zero stop pawl 220 out of the reach of the main differential member 22.

In total taking machine operations, in which also no key is depressed, but in which the main differential member has to be freely movable, the zero stop pawls 220 are disengaged in the manner which will now be described:—

Figures 10, 10A:
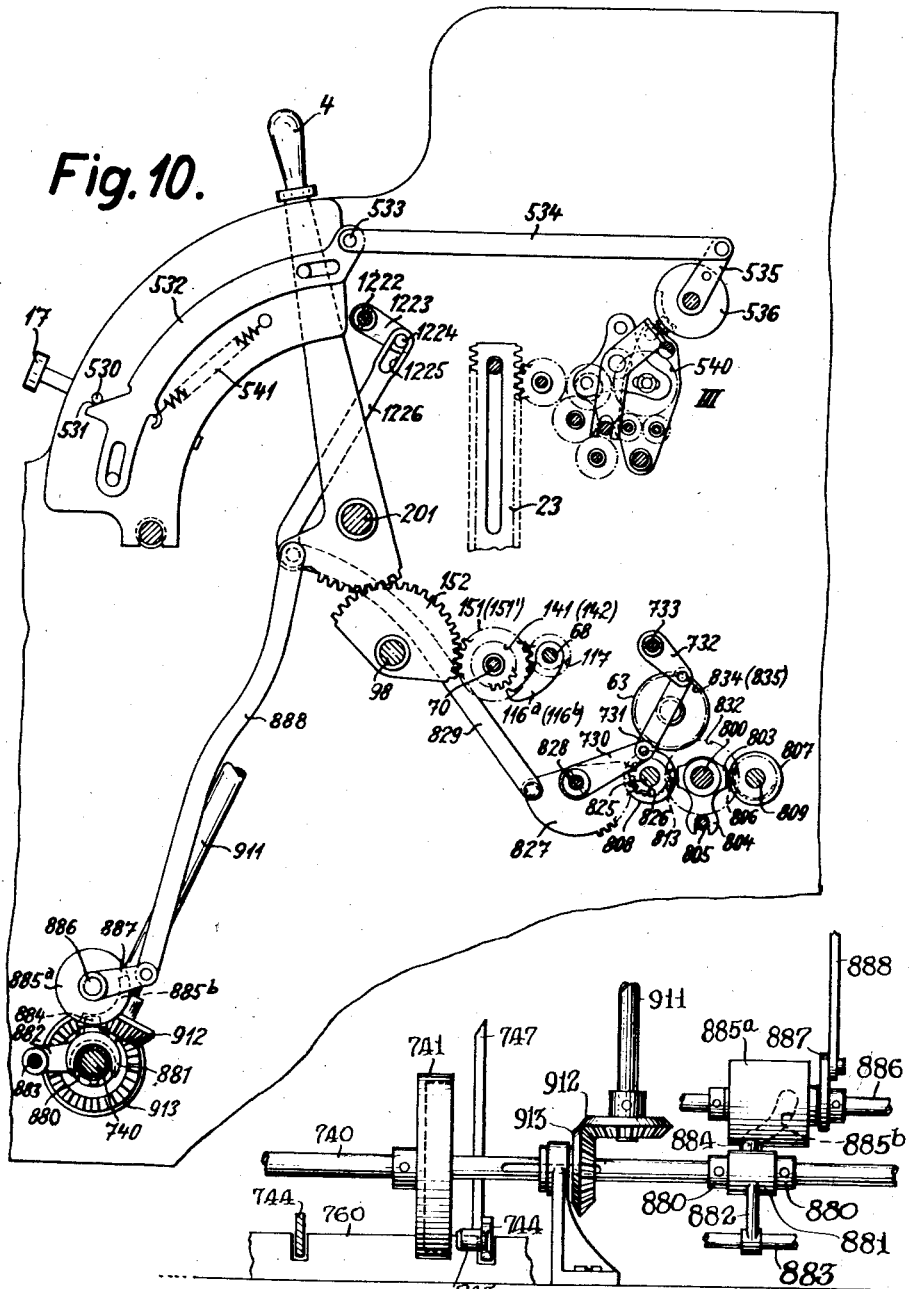

Each zero stop pawl has secured thereto a stud 1220 cooperating with an arm 1221. The arms 1221 of all the denominational orders are fixed to a shaft 1222 carrying also an arm 1223 (Fig. 10), connected, by means of a pin and slot connection 1224, 1225 and a link 1226, to the balancing lever 4 (Fig. 10). If the balancing lever is lowered into the position "balance", all the zero stop pawls 220 are disengaged through the beforementioned connection. The shaft 1222 is able to be displaced also by the mode of operation lever 5 in the same manner as by the balancing lever 4, but not shown herein. In total taking, by means of a special interlocking device specified in the beforementioned U. S. A. Patent No. 1,899,455, the auxiliary differential member 21 is retained in its normal position until the main differential member 22 is positioned correspondingly to the value of the respective adding wheel, whereupon this differential member is locked and the auxiliary differential member is released to perform the remainder of the movement effected by the differential gearing. This locking device, not detailed here, is released by the tens transfer tooth of the respective adding wheel to be reset, in a manner described later on.

Further, in each key bank, the shaft 201 (Fig. 2a) has rotatably mounted thereon a differential member 245 carrying a stud 246 engaged by the two differential members 21, 22 and set according to the position of the main differential member 22. When the differential members are restored, the differential member 245 remains in the position set. Each differential member 245 is provided with a set of teeth 247, meshing with one gear 248 each mounted on shaft 94. By means of hollow shafts 249 the wheels 248 are connected with the type wheels of a printing device not being an object of the present invention and, therefore, not detailed here.

TOTALIZERS AND RETAINING DEVICES

In the machine, there are provided, in addition to the adding devices (totalizers) comprising adding wheels and directly operated by the amount differential racks 23, retaining devices comprising racks and receiving indirectly from the amount differentials the amounts set. The totalizers are arranged in four rows, one above the other (Fig. 2b), row I comprising an add and subtract totalizer, row II six auxiliary totalizers, row III a multiple item totalizer, and row IV an add and subtract totalizer which cooperates with the retaining devices in a manner set forth later on.

TOTALIZER ROW I

Figure 3A:
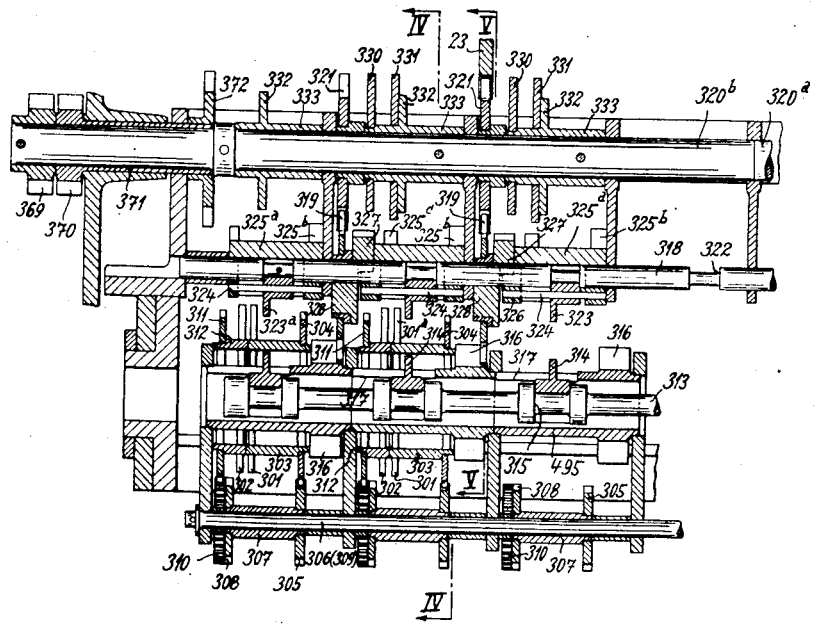
Figure 3B:
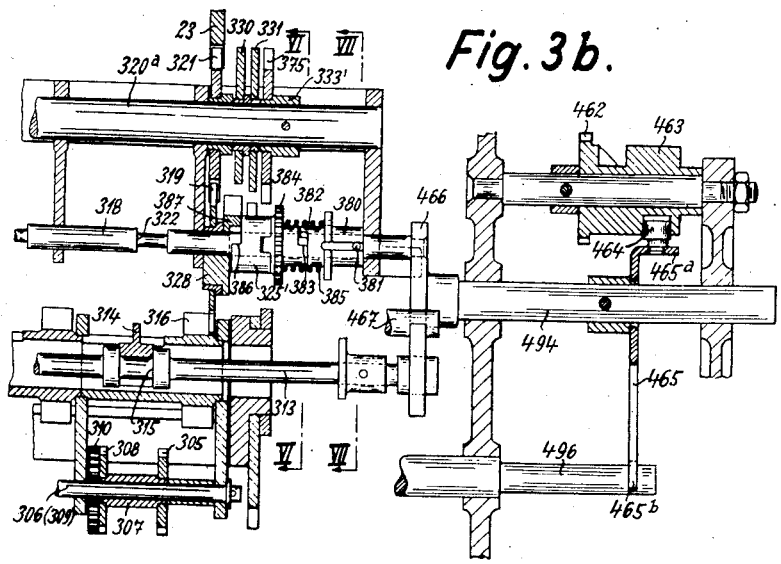
Figure 4:
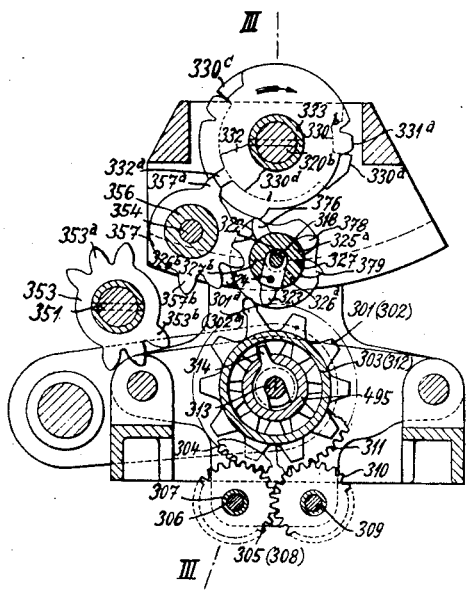

The add and subtract totalizer in row I is constructed like that disclosed in copending application for a U. S. A. Patent, Ser. No. 522,053 filed March 12, 1931, now Patent No. 2,052,444, issued August 25, 1936, and, therefore, it will be described here only briefly. In the said totalizer, for each denominational order, there are provided two wheels the one thereof being the adding wheel 301 and the other the subtract wheel 302 (Figs. 3a, 3b and 4). The hub 303 of each adding wheel 301 has secured thereto a gear 304 meshing with a gear 305 secured to a hub 307 on the shaft 306. further, the said hub 307 has secured thereto a gear 308 meshing with a broad gear 310 on the shaft 309. The broad gear 310 meshes with the gear 311 secured to the hub 312 of the subtract wheel 302. Thus, when the one computing wheel is operated, the companion wheel is rotated to the like extent in opposite direction.

The computing wheels 301, 302 are provided with internal teeth enabled to be meshed by the riders 314 arranged on the shiftable rider axle 313. The riders 314 are mounted in recesses on the rider axle 313, so that they can take part in the axial movement of the rider axle 313, but are free to rotate about the said axle.

The rider axle 313 can be shifted into three positions in which the riders engage either the internal teeth of the adding wheels 301, or the internal teeth of the subtract wheels 302 or neither thereof.

The computing wheels 301, 302 of each order are mounted on the enlarged hub 495 of an actuating device 316. The hub 495 is provided with longitudinal slots 317 in which the rider 314 is able to be shifted. The internal teeth of the computing wheels engaged by the rider 314 to couple them with the actuating wheel 316. The actuating wheel 316 is driven in accordance with the depressed amount key of the respective order, after the amount differential rack 23 (Fig. 2b) allotted thereto, has been set correspondingly during the first portion of the machine operation.

Before restoring the set amount differential racks 23 the add and subtract totalizer is coupled therewith in that it is rocked so far that the actuating wheels 316 come in mesh with the tens transfer wheels 319 eccentrically mounted on the shaft 318. The said wheels 319 mesh permanently, through intermediate wheels loosely mounted on the shaft 320, with the amount differential racks 23.

Figure 5:
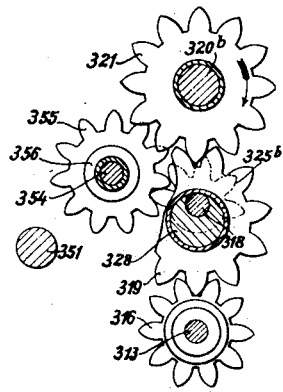

In an adding operation, the amount differential racks 23 are first set according to the depressed amount keys 10, and then the actuating wheels 316 are coupled with the wheels 301, in a manner set forth hereinafter, by shifting the rider axle 313 into its adding position under control of the depressed special keys 11 to 14. After the wheel 301 has been coupled to the actuating wheel 316, the add and subtract totalizer is rocked to engage the actuating wheels 316 into mesh with the tens transfer wheels 319 (Fig. 5). The amount differential racks 23 are then restored to their home positions to rotate the actuating wheels 316 in a clockwise direction to enter amounts into the wheel 301 according to the setting of the amount differential racks. This rotation of the wheels 316 is transferred to the computing wheels—in the case assumed, to the adding wheels 301—coupled with the actuating wheels 316. The other computing wheels—the subtract wheels 302—are rotated, however, in opposite direction, that is, in counter-clockwise direction to the same extent as the adding wheels 301. When amounts are to be subtracted, the rider axle 313 is shifted so far to the left (Figs. 3a, 3b) that the riders 314 couple the subtract wheels 302 with the actuating wheels 316. In so doing the operation is the same as when coupling the adding wheels 301 to the wheels 316 except that the subtract wheels 302 are clockwisely rotated and the adding wheels 301 counter-clockwisely.

Simultaneously with the rider axle 313, the shaft 318 (Figs. 3a, 3b and 4) is shifted. The shaft 318 has recesses 322 for tens-counter-teeth 323 which are rotatably mounted therein, in such a manner that they are always in alinement with the respective riders 314 and in the path of the tens transfer tooth 301a or 302a of the coupled computing wheels 301 or 302 respectively. If, in any denominational order, a wheel passes from "9" to "0", the tens tooth 301a and 302a of the coupled computing wheel 301 and 302 respectively, engages the tens counter-tooth 323 and rotates it counter-clockwisely about the shaft 318 by 45 degrees. The tens transfer pinion 325 is freely rotatably mounted on the shaft 318, however, it is not shiftable therewith, and its hub 325a has a recess for the tens counter-tooth 323 adapted to slide together with the shaft 318, to be shifted therein. The tens counter-tooth 323 is, by means of a short rod 324, connected to the tens transfer pinion 325 so that when the shaft 318 is shifted, it is enabled to slide in the recess of the hub 325a, but the two parts rotate together about the axis 318. On the left hand side of the tens transfer pinion 325 a projection 326 is provided which cooperates with a projection 327 of an eccentric 328 loosely mounted on the shaft 318. The two surfaces 326a and 327a of these projections form an angle of 45° corresponding to the preparatory transfer travel, while the two other surfaces 326b and 327b in the rest position bear against each other. While the tens counter-tooth 323 rotates clockwisely by 45°, the tens transfer pinion 325 is rotated by this angular amount too, until the one surface 326a of the projection 326 contacts with the abutment surface 327a of the projection 327. The tens transfer pinion 325 is yieldingly held locked in each position by means of a locking pawl not shown in the drawings and the eccentric is locked in its rest position by means of a locking disk 330. The eccentric locking disk 330 is secured to a hub 333 pinned to the shaft 320. Further, the hub 333 has secured thereto a step disk 331 and another locking disk 332, the two disks locking the tens transfer pinion 325 against unintentional rotation.

Intermittent movements are imparted to the step shaft 320 and the step locking disks by the machine operation, during which movement the tooth 331a of the step disk 331 rotates the tens transfer pinion 325 90 degrees in a counter-clockwise direction from the position to which it was rocked by the transfer tooth 301a or 302a. Due to the surfaces 326a, 327a engaging each other, the eccentric 328 is also rotated by 90°. The eccentric 328 carries the tens transfer wheel 319 (Fig. 5) meshing with the amount differential intermediate wheel 321 as well as with the actuating wheel 316 of the next higher denominational order. When the eccentric 328 is rotated by 90°, the tens transfer pinion 319 rolls on the stationary intermediate wheel 321 and advances the actuating wheel 316 of the next higher order by one unit.

The parts necessary for the amount and tens transfer, as well as the respective step disks 331, are arranged in each decimal order. Since the tens transfers, beginning from the lowest order, are to be following one another and running through all the orders, the actuating points, that is, the teeth 331a of the step disks 331 are arranged on the step shaft 320 in a helical line. In case a large number of orders would have been provided, the angular spaces of the actuating points would be too small with the step disks being of normal diameter, wherefore the step shaft 320 is subdivided into two partial step shafts 320a, 320b. In the present embodiment of the invention the arrangement is made so that the right hand portion 320a of the step shaft is allotted to the six lower orders and the left hand portion 320b to the three higher orders of the add and subtract totalizer.

Restoration of the tens transfer parts displaced in a tens transfer action, is effected by means of a restoration shaft 351 (Fig. 4) driven by the machine, the said shaft being arranged to extend through the whole length of the add and subtract totalizer. To the said shaft there are secured the restoring wheels 353 pertaining to the respective denominational orders and serving, through their two sets of teeth 353a, 353b to restore the parts displaced during a tens transfer, to initial positions, at the start of the following machine operation. The right hand end of each tens transfer pinion 325 is provided with a set of five teeth 325b (Fig. 5) meshing with a restoring pinion 355 mounted on the shaft 354, and rotating said pinion clockwisely by about 120° while the tens transfer pinion 325 is rotated. The restoring pinion 355 is secured on a hub 356 loosely mounted on the shaft 354, said hub having secured thereto also the restoring segment 357 (Fig. 4). The teeth 357b thereof are able to cooperate with the teeth 353a, 353b of the restoring wheel 353. During the tens transfer action, the restoring segment 357 is clockwisely rotated by about 120°. The segment 357 is not hindered from performing this rotation, since the teeth 357b are not faced by teeth of the restoring wheel 353. At the beginning of the next machine operation, the rotation of the restoring shaft 351 in clockwise direction is started, and, now, one of the sets of teeth 353a, 353b of the restoring wheel 353 comes into mesh with the teeth 357b of the segment 357 and restores to initial position the restoring pinion 355 and, in connection therewith, also the tens transfer pinion 325, whereby also the tens counter-tooth 323 is restored to working position and is ready for preparing a new tens transfer.

If the add and subtract totalizer contains a positive total, and, in adding a further amount, the capacity of the totalizer is being exceeded, the wheel of the highest order passes from "9" to "0". This transition can be effected only by a tens transfer, since no amount key bank and no amount differential racks 23 are arranged in the highest order of the add and subtract totalizer. The tens tooth 301a of the adding wheel of the highest order (Figs. 3a, 3b, 4) engages the tens-counter-tooth 323a of the highest order, rotating said tooth by 45°. The tens-counter-tooth 323a is pinned to the shaft 318, so that the latter is rotated too. On the right hand end of the shaft 318 (Figs. 3b and 7) a sleeve is mounted, provided with a longitudinal slot engaged by a pin 381 of the shaft 318, so that the sleeve 380 does not take part in the shifting of the shaft 318, however, is enabled to rotate with the shaft 318. The sleeve 380 is provided on its left hand side with a projection 382 (Figs. 3b and 6) to cooperate with a projection 383 of the tens transfer pinion 325' loosely mounted on the shaft 318. The tens transfer pinion 325' is arranged in advance of the lowest order and carries a gear 384 rigidly connected thereto. Between the sleeve 380 and the gear 384 a torsion spring 385 is interposed to hold the surfaces 382a and 383a of the projections 382 and 383 in contact with each other whereby the other surfaces 382b and 383b are positioned apart from each other by 45°, which angle corresponds to the preparatory travel.

Figure 6:
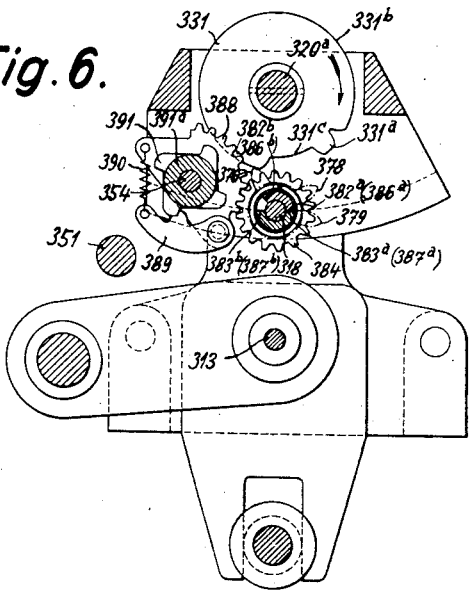

The tens transfer pinion 325', on its left hand side, is also provided with a projection 386 cooperating with the projection 387 of the respective eccentric 328. In the rest position, the surfaces 386a and 387a of the two projections 386 and 387 are engaging each other, whereas the other surfaces 386b and 387b enclose an angle of 45° (Fig. 6). These tens transfer parts located in front of the lowest order, have allotted thereto also the respective step and eccentric locking disks.

Figure 7:
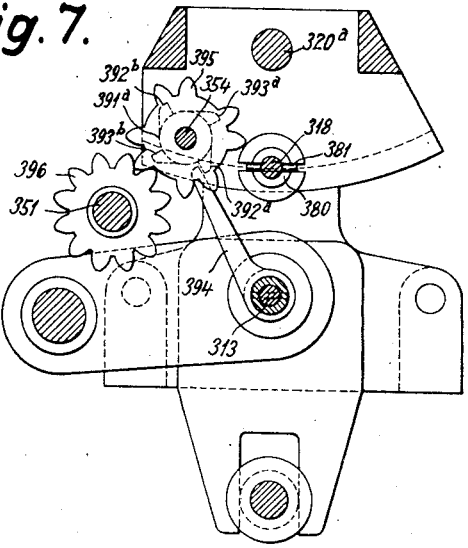

The gear 384 meshes with a toothed segment 388 (Fig. 6) loosely mounted on the shaft 354, the said segment having linked thereto a control pawl 389 held by the spring 390 in mesh with the control wheel 391 provided with four teeth. Also the control wheel 391 is loosely mounted on the shaft 354, and its hub 391a is provided with four control cams 392a, 392b and 393a, 393b (Fig. 7). These control cams are arranged in two planes, namely, in such a way that the cams 392a and 392b, facing each other, of the other plane are alternated by 90°. These cams cooperate with a locking arm 394 rigidly connected to the unrotatable rider axis 313 and shifted therewith. Thereby said arm comes, when the rider axle is shifted to the adding position, into the path of the cams 392a and 392b, and if it is shifted to the subtract position, into the path of the cams 393a and 393b.

If a positive total is accumulated on the add and subtract totalizer and a positive amount is added thereto, one of the cams 392a or 392b lies in front of the locking arm 394. If, by adding this amount, the capacity of the add and subtract totalizer is exceeded in the positive sense, a tens transfer, as already set forth, in the highest decimal order is prepared by the adding wheel passing from "9" to "0", whereby the sleeve 380 is given a rotation by 45°. Since, however, the locking arm 394 lies in front of one of the cams 392, the control wheel 391 is locked and, in connection therewith, also the toothed segment 388 and the gear 384. While the sleeve 380 is rotated by 45°, the action of the torsion spring 385 has to be overcome, until the surface 382b of the sleeve 380 bears against the surface 383b of the tens transfer pinion 325' (Fig. 6). As soon as the tens tooth 301a of the adding wheel of the highest order frees the tens-counter-tooth 323a again, the torsion spring 385 restores to the initial position the shaft 318 with the sleeve 380 and the tens-counter-tooth 323a. During the now following last part of rotation, by 300°, of the step shaft 320a, the step disk 331 passes unoperatively the tens transfer pinion 325' positioned in front of the lowest order, since the said pinion has not been displaced and, therefore, no tooth of the teeth 325' of the tens transfer pinion 325' is in the path of the step disk 331.

If the add and subtract totalizer has accumulated thereon a negative total, and, through subtracting an amount, the lowest limit of the capacity has been exceeded, a tens transfer, in the highest order, takes place through the subtract wheel passing from "9" to "0", which tens transfer is transmitted, as a rotation by 45° through the shaft 318, to the sleeve 380. In this case the locking arm 394 is shifted, by means of shifting the rider axle 313 into subtract position, to the left, and, in so doing, it faces one of the control cams 393a or 393b, whereby the control disk 391 and, in connection therewith, also the tens transfer pinions 325' are locked. Thus the rotation of the sleeve 380 is not transferred to the tens transfer pinion 325' held locked, but remains ineffectively, the action of the torsion spring 385 being overcome. Also in this case, the last part of rotation of the step shaft 320a is not effecting the transfer of an additional unit.

If the add and subtract totalizer has accumulated thereon a positive total, and, through the subtraction of an amount, transition from the positive to the negative value is effected, the subtract wheel of highest order serving, now, as computing wheel, is passing from "9" to "0". Thereby the tens-counter-tooth 323a of highest order, the shaft 318 and the sleeve 380 are rotated by 45°. By conditioning the totalizer to subtraction, the rider axle 313 and, in connection therewith, the locking tooth 394 are shifted to the left, so that the latter is moved into the plane of the cams 393a and 393b lying, now, not parallel but apart from the locking arm 394 by 90°. The tens transfer pinion 325' lying in front, is, therefore, not locked, and is carried along by 45° during the rotation of the sleeve 380, since the spring 385 keeps the surfaces 382a and 383a of the sleeve 380 and the tens transfer pinion 325' in engagement, whereas the angular gap of 45° between the surfaces 386b and 387b of the projections 386, 387 of the tens transfer pinion 325' and the eccentric 328 is closed. After this preparation, the last part of rotation of the step shaft 320a is effected, whereas the step disk 331 in front of the units order, rotates the tens transfer pinion 325' rotated already by 45°, additionally by 90°, whereby also the respective eccentric 328 is rocked by 90°. In so doing, the tens transfer pinion 319 mounted on the eccentric 328, rolls on the stationary amount differential intermediate wheel 321 (Figs. 3a, 5) and advances the transfer wheel 316 of the units order by one unit. If, while this tens transfer is effected, the subtract wheel 302 coupled with this transfer wheel, passes from "9" to "0", a tens transfer in the next higher order is also prepared and effected, during the last part of rotation of the step shafts 320a, by means of the respective step disk 331. This tens transfer is continued, in this manner, so far as necessary.

The same operation takes place when the add and subtract totalizer contains a negative total which, after a positive amount has been added, changes into a positive total. Therefrom it becomes evident that the additional transfer of a tens transfer from the highest order to the units order is effected only when a positive amount changes into a negative one, or vice versa, that means when the sign is changed, but not when the capacity of the add and subtract totalizer is exceeded by accumulating thereon amounts having the same sign.

Figure 8:
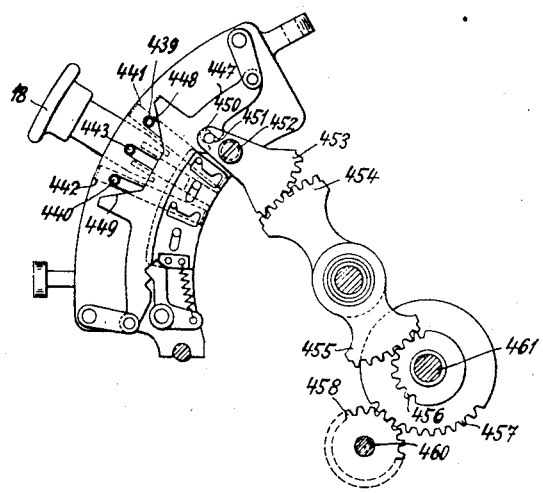

The selection of the positive or negative side of the add and subtract totalizer is effected in the manner disclosed in the copending patent application Ser. No. 522,053, Patent No. 2,052,444, under the control of the keys 11 to 16 for the auxiliary totalizers. According to whether a positive, or negative, amount is to be transferred to the add and subtract totalizer, or to be taken therefrom, one of two blind keys 441, 442 located in the motor key bank, is coupled with the motor key 18 and, upon depressing said key, carried along by means of the pin 443 (Fig. 8). Through pins 439 and 440, the blind keys act upon two oppositely directed bevelled surfaces 448, 449 of a coupling slide 447 rockably supported in the motor key bank by two arms. An open slot 450 of the coupling slide engages the pin 451 of a toothed segment 453 pivoted on a stationary stud 452, said segment being in mesh with the teeth 454 of a toothed double segment 454, 455. The second segment cooperates with a gear wheel 456 mounted on a shaft 461, the said wheel having rigidly connected thereto a gear wheel 457 meshing with a gear wheel 458.

The wheel 458 is secured to a shaft 460 (Fig. 8) and operates, through the suitable intermediate gearage, a drum cam 463 (Fig. 3b) in such a manner that said cam, according to which of the two blind keys 441 or 442 is rendered operative, may occupy two different positions. The cam 463 is provided with a cam groove engaged by a sliding roller 464 carried by the arm 465a of a lever 465. The lever 465 is secured on a shaft 494 supported by interposed machine walls to be axially shifted therein. The forked rear end 465b of the lever 465 is straddled on a shaft 496, so that the lever 465 is capable to be shifted but not to be rotated. The shaft 494 has secured thereto the plate 466 having unshiftably connected thereto the shiftable shaft of the add and subtract totalizer, namely, the rider axle 313, the tens transfer shaft 318, and a total taking shaft 467. Through the rotation of the cam 463, the plate 466 and the shafts 313, 318 and 467 connected therewith, are shifted, by means of the groove and the roller 464, into the add or subtract position, according to whether the blind key 441 or 442 has been depressed.

TOTALIZER ROWS II AND III

The totalizers of the rows II and III differ essentially from the add and subtract totalizer of row I only in that, in each denominational order, instead of the add and subtract wheels, one or more adding wheels 500 belonging to totalizers independent of one another, are arranged (Fig. 9). The tens transfer device is the same, only the mechanism for transferring the fugitive "one" is omitted, since the totalizers accumulate only amounts of the same sign. Fig. 9 shows a portion of the totalizer row II, and the similar details known from the description of the add and subtract totalizer in row I, have assigned thereto the same reference numerals used there. The row III distinguishes from the row II in that, in each denominational order, only one single adding wheel is provided.

The selection of the respective totalizers of row II is effected in the following manner:—

In the auxiliary totalizer key bank (Fig. 15) a differential device is arranged which, like the amount differential device set forth already, consists of two complementarily operated differential members 89 and 90 embracing the stud of a differential member 91 and setting the latter according to the key 11 to 16 depressed at the time. The differential member 91 has teeth 502 meshing with a wheel 503 arranged on the shaft 504. Further, the shaft 504 carries a wheel 505 connected, over intermediate wheels, with a drum cam 512 (Fig. 9), corresponding to the roll 463 of the totalizer row I and serving for shifting the plate 466 in the totalizer row II. The cam groove of the drum cam 512 is shaped so that the riders 314, by means of the said connection, are alined with the adding wheels corresponding to the auxiliary totalizer key depressed. The keys 15, 16 serving for selecting the totalizers for the new balances, have no heads, and are automatically set as it is set forth broadly in the copending application Ser. No. 522,053, Patent No. 2,052,444.

The multiple item totalizer in the row III is selected as will now be described:—

The stem of the key 17 (Fig. 10) has fixed thereto a pin 530 cooperating with a bevel surface 531 of a slide 532 tensioned by spring 541. A stud 533 of the slide 532 has linked thereto a pulling rod 534 the other end of which engages an arm 535 rigidly connected with the drum cam 536. The drum cam 536 lies in the totalizer row III and corresponds to the cam 463 of the totalizer row I. According to whether the key 17 is depressed or not, the cam 536 is set to one of two positions in which, by means of a suitably shaped cam groove, said cam alines the riders of row III with the adding wheel 540 provided in each denominational order, or moves them into an idle position.

TOTALIZER ROW IV

In row IV an add and subtract totalizer is arranged the construction of which is as follows:—

On an axis 68 (Figs. 12, 22 and 34) supported in the machine frame, two computing wheels, in each denominational order, viz. an adding wheel 75 and a subtract wheel 80, are loosely mounted and rotatable, but not shiftable. By means of a reverse gearing 76 to 79, these wheels are connected with each other in such a manner that, just as is the case in connection with the add and subtract totalizer of row I, each wheel while rotating, carries along the other wheel by the same number of differential steps, however, in opposite direction.

Above the axis 68, an axis 66 shiftable in axial direction, is arranged, said axis being supported by two arms 67 (Fig. 21) loosely mounted on the axis 68, but not laterally shiftable. The arms 67 cooperate with each one of two similar cam disks 69 (Figs. 21 and 23) mounted on a shaft 70 to impart to the axis 66, in a manner to be set forth hereinafter, a rocking movement at certain times. In each denominational order a coupling pinion 65 is rotatably, but not shiftably, mounted on the shaft 66, which pinion has a portion 65a of greater diameter, enabled to be brought in mesh, by means of shifting the axis 66, either with the adding wheels 75, or the subtract wheels 80. Besides, the portion 65a is engaged with the amount differential racks 23 (Fig. 21) upon rocking the axis 66.

In addition to the axis 68 carrying the computing wheels, an axis 109 is supported in the machine (Figs. 2b, 11a, 11b, 12, and 13) having mounted thereon the tens transfer members 601, and shiftable together with the axis 66. The tens transfer members 601 (see also Figs. 34, 39 and 40) of star-like cross section are rotatably but unshiftably mounted on the axis 109, and they are so broad that when shifted, they are able to cooperate, just like the portions 65a of the coupling pinions 65, either with the add or the subtract wheels. Each tens transfer member is provided with three teeth 602 symmetrically placed on the circumference, and one thereof lying always in the path of the tens tooth 603 of the add or subtract wheel (Fig. 13), and being displaced by said tooth when the respective denominational value passes from "9" to "0", so that the control member 601 performs a counterclockwise rotation by one sixth. Through this movement, another tooth 602 is brought into the recess 604 of a disk 605 secured to a shaft 55. During each machine operation, after the amount differential racks 23 are restored to rest position, the shaft 55 performs two complete rotations in clockwise direction, and, in so doing, the rear edge 604a of the recess 604 carries along the respective tooth 602 so far that the tens transfer member 601 is displaced by a further one sixth rotation, and is ready for a new cooperation with the tens tooth of the add or subtract wheel. Rigidly connected by means of a sleeve 606, with the tens transfer member 601 there is a broad gear 607 meshing with a gear 609 mounted rotatably, but not shiftably, on a stationary axis 608, the said gear being connected by means of a hollow shaft 610 with a control piece 611 lying in the next higher denominational order. The ratio of gearing between the wheels 607 and 609 is such that when the tens transfer pinion 601 performs a one-sixth rotation, the control member 611 performs a one-quarter rotation. The control member 611 is provided with two rollers 614 lying within the reach of a gear 612 loosely mounted on the axis 109, but, when in rest position, not meshing with the teeth of said gear (Fig. 14). The gear 612 meshes with a gear 615 loosely mounted on the axis 68 and rigidly connected with a gear 616 meshing with the coupling pinion 65.

As previously set forth, the tens transfer pinion 601 is given, by means of the tens tooth of the add or subtract wheel, a one-sixth rotation when the said wheels pass from "9" to "0". This movement is transferred over the connections 606 to 610 to the control member 611 of the next higher order, whereby the said member is counterclockwisely rotated by a one-quarter rotation, so that one of its rollers 614 is advanced tight to the teeth of the gear 612. During the further one-sixth rotation of the tens transfer pinion 601 effected by the disk 605, the control member 611 of the next higher order performs a further one-quarter rotation, and, in so doing, the roller 614 advanced to the gear 612, comes in mesh with its teeth, tripping it by one tooth. Through the gears 615 and 616, and the coupling pinion 65, and its portion 65a respectively, this step is transmitted to the adding or subtracting wheel being, thus, advanced by one unit. At the end of this operation, the control member 611 occupies a position identical with its original position, but changed by 180°, so that all the parts are ready for a new tens transfer.

Transferring the tens transfer movement from the tens transfer member 601 to the control member 611 of the next higher order is effected alternately through the hollow shaft 610 and a hollow shaft 622 (Figs. 11a and 11b). In each order, the control member 611 associated therewith, having been actuated, as set forth, through the hollow shaft 610, the broad gear 607 meshes with a gear 621 loosely mounted on the shaft 620, the said gear 621 being rigidly connected by means of the hollow shaft 622 with a control member 623 of the next higher order. The roller 614 of this control member coacts with the gear 612 of this denominational order, the said gear being connected, in the manner set forth previously, to the coupling pinion 65. Transmitting the tens transfer movement to the next higher order occurs, then, again over the hollow shaft 610. For instance, the tens transfer movements from the units Cent order to the Dime order are transmitted over a hollow shaft 610, from the Dime to the unit-Dollar-order over a hollow shaft 622, from this order to the tens Dollar order again over a hollow shaft 610, and so on.

In the highest order of the add and subtract totalizer (Fig. 11b) the gear 621 driven by the broad gear 607, is rigidly connected to the shaft 620 carrying the hollow shafts 622. In the lowest order of the add and subtract totalizer a sleeve 630 is pinned to the shaft 620 (Figs. 11a and 12), the said sleeve being joined by another sleeve 632 mounted rotatably but unshiftably on the shaft 620. Both the sleeves are provided, on the facing ends, with claws 631, 633 coupling the said sleeves with each other, but permitting the sleeves to rotate by a certain extent independently of each other. The two claws 631 and 633 are held by a spring in such a position relatively to each other that the sleeve 630, by overcoming the action of the spring 634 and closing the space between the two claws, is able to move under the control of the tens tooth of the highest order when the sleeve 632 is arrested. The sleeve 632 carries two arms 635 and 636 arranged apart from each other by 180°, each arm lying in a separate plane. These arms cooperate with a locking arm 637 enabled when laterally shifted together with the coupling pinion 65, to be bought within the reach of the arm 635, or the arm 636. Further, the sleeve 632 has secured thereto a control member 623 and a gear 638 meshing with a gear 639 mounted on the shaft 109. If the wheel of the highest order of the add and subtract totalizer passes from "9" to "0", the tens transfer member 601, as already set forth, is, first, rotated so far that one of its teeth 602 enters the recess 604 of the respective disk 605. Through the gears 607 and 621, and the shaft 620, this movement is transferred to the sleeve 630 and therefrom by means of the spring 634 to the sleeve 632. If, now, the locking arm 637 is not faced by any arm 635 or 636, the sleeve 632 may follow the sleeve 630, and one of the rollers 614 of the control member 623 of the lowest order is advanced tight to the teeth of the gear 612. While the tens transfer movement is now completed by the disk 605 of the highest order, the control member 623 of the lowest order is further driven by the beforementioned connection, whereby, through the parts 612, 615, 616, 65, 65a the add or subtract wheel is tripped by one unit.

If the locking arm 637 lies in front of one of the arms 635, or 636, the sleeve 632 when a tens transfer occurs in the highest order, is unable to partake in the movement of the sleeve 630, and, in closing the gap between the claws 631 and 633, the spring 634 is tensioned. If the tens tooth 603 in the highest order has freed the tooth 602 cooperating therewith, the tens transfer member 601 is clockwisely rotated back by means of the spring 634, so that all the parts regain the position they occupied before tens transferring. Since together with the sleeve 632 also the control member 623 is locked, in the case under consideration, tripping the wheel by one unit does not take place in the lowest order.

As already mentioned, the locking arm 637 is shifted together with the coupling pinions 65. If, for instance, the add and subtract totalizer has accumulated thereon a positive amount, and if a further positive amount has to be added, the coupling pinions 65 are shifted so that their portions 65a come in mesh with the adding wheels 75. At the same time the locking arm 637 is moved into the plane of the one arm 635 just facing the locking arm, for this position corresponds to a positive balance on the add and subtract totalizer. If, now, a further positive amount is added, causing an overdraft of the add and subtract totalizer capacity, a tens transfer occurs in the highest order. Thereby the sleeve 630 is rotated in the specified manner, but tripping the wheel, in the lowest order, by one additional unit does not occur, as the sleeve 632 is unable to partake in the rotation. If, however, from a positive amount a greater negative amount is subtracted, the locking arm 637 is moved into the plane of the arm 636 which, however, is not opposite the locking arm, since the add and subtract totalizer contains a positive amount. Likewise, the sleeve 632 is not locked by the arm 635 if a greater positive amount is added to a negative amount, but locking through the arm 636 occurs also when the capacity is exceeded in the negative sense. That means, adding the unit in the lowest order occurs here, just as in the case with the add and subtract totalizer I, always when the sign of the add and subtract totalizer balance is changing, but not when the capacity of the said totalizer is overdrawn.

The recesses 604 in the disks 605 are so arranged and shaped that the remaining portion of the rotation of the tens transfer members 601, beginning from the lowest order is effected successively, that means, tens transferring is effected step by step, just as in the add and subtract totalizer I. The second rotation of the shaft 55 serves for adding the unit in the lowest order, and performing the tens transfer actions caused thereby.

In each denominational order, the shaft 55 has loosely mounted thereon a pawl 870 having a roller 871 engaging under the action of a spring 872, the teeth of the gear 607, and thereby yieldingly locking the tens transfer pinion 601. A pawl 877, having a roller 875, is also provided in each denominational order, which under the action of a spring 876 engages the gear 77 thereby yieldingly arresting the adding wheel 75 and the subtract wheel 80.

The lateral shifting of the axis 66 supporting the coupling pinions 65, the axis 109 and the locking arm 637 for selecting the positive or negative side of the add and subtract totalizer IV is controlled by the auxiliary totalizer keys, as it is done in connection with the add and subtract totalizer I, when the transactions are entered. The differential member 91 of the auxiliary totalizer key bank (Fig. 15) has rigidly connected therewith a segment 92 having a cam groove 92a engaged by the roller 93a of an arm 93 fixed to a shaft 94. At the other end of said shaft 94 is secured an arm 95 having a forked end embracing the pin 96 of an arm 97 fixed to a shaft 98. The shaft 98 carries a gear 99 constantly meshing through a gear 100, with a gear 101. The gear 101 mounted on the shaft 68, is connected by means of a differential gearing 102, 103, 104 (Figs. 16, 17, and 20), to a drum cam 74, which by means of the cam groove 74a, the roller 73, and the plate 71, shifts the shaft 109 and the locking arm 637 into the add or subtract position. The shaft 66 and the plate 71 are yieldingly connected, as will be set forth hereinafter, so that the shaft 66 can be given a further shift independently of the cam groove 74a.

During the entering of a transaction amount the axis 68 supporting the planetary gear 103 (Fig. 16) is arrested by a stationary stud 105 in the following manner:—

In the auxiliary totalizer key bank a detent 660 is provided (Fig. 15), having two bevelled surfaces 661 coperating with pins 662 of the keys 13, 14 for the deposits and withdrawals in such a manner that, upon depressing one of these keys, the detent 660 is pulled downward against the action of a spring 663. The detent 660 is provided with a fork-like projection 664 engaging the stud 665 on a two-armed lever 666, 667 (see also Fig. 36) loosely mounted on the shaft 201. The lower arm of said lever carries a locking nose 668 engaging when the detent 660 is shifted, the recess 669a of a disk 669 connected with the wheel 132 (see also Fig. 19), thus, preventing the said wheel and the gears 131 and 138, and the shaft 68 from rotating. In this case, the bevel gear 103 serves only as an intermediate gear, and the movements caused by the cam groove 92a are transferred to the cam 74. The cam groove 92a is so shaped that the train of transmitting members 93 to 102, during all the adding operations, is arrested in the position corresponding to the adding position, and is moved by one unit only when a withdrawal is entered, whereby the cam 74 is rotated so that the shaft 66 is shifted to the right and, thus, the minus-side of the add and subtract totalizer IV selected.

During balancing operations wherein the totalizer IV is used, the old balance is taken from the retainers 122. During such balancing operations the selection of the add or subtract side of the totalizer IV cannot be effected by the auxiliary totalizer selecting keys, as is the case with this selection of the add and subtract totalizer I, by means of the auxiliary totalizer keys. During the machine operations for the old and new balances, the auxiliary keys, by means of the cam groove 92a, lock the differential wheel 102 in the position appropriate to entering deposits, and the proper side of the totalizer is selected by the retainers. For this purpose, the retainers have allotted thereto as will be described later on, one slide 122 (Figs. 15, 18) for each set, and each is enabled to occupy two different positions by which the said slide identifies the sign of the contents of the respective retainer. The slides 122, during the machine operations for the old balances, are latched in their respective positions by means of a latching bar 119 (Figs. 15, 19) engaging locking notches 121. The latching bar 119 is supported by lateral carriers 118 guided on a shaft 120. The carriers 118 are engaged by arms 115 of a sleeve 113 provided also with a gear 117 connected by means of the parts 151, 152 (Fig. 10) to the balancing lever 4, viz. in such a manner, that when the lever 4 is set to adding, the latching bar 119 is moved into its locking position, whereas said bar is in its lower position when the lever 4 is set to "balance".

Each of the slides 122 (see also Fig. 35) is provided with an extension 122a able to be brought, as will be described hereinafter, in the path of two rods 124 and 124'. The rods 124 and 124' are supported by the arms 125 and 125' and, upon operation of the machine, the said rods are complementarily actuated in opposite direction by the shaft 70, through a train of gears 127 to 134 (Fig. 16), to the effect that they embrace scissor-like the extension 122a. If, now, by means of the differential gearing 127 to 134, the tongs are closed and the slide 122 is in positive position, the rod 124 with the teeth 133 will not move (Fig. 19); whereas when the rod 122 is in the negative position (Fig. 15), the rod 124 upon closing the tongs has to move a certain extent in counter-clockwise direction.

The setting of the rod 124 is transferred by means of the parts 132, 131, 138, 68 to the planetary gearing 102, 103, 104. But the gear 102, when the old balance is entered, is arrested by the curved slot 92a so that the setting of the rod 124 depending upon the position of the slide 122, is transferred to the drum cam 74, and, thus, the plate 71 and the appropriate shafts are set accordingly. By this means, when the old balance is entered, the plus- or minus-side of the add and subtract totalizer IV is brought in engagement with the portions 65a of the coupling pinions 65 according to the positive or negative balance of the retainer selected at the time. At the end of the machine operation, the rod 124 when displaced, returns to rest position shown in Fig. 15 and in so doing carries along the pinion 103 so that the latter is again in its initial position corresponding to the positive contents of the retainers.

As set forth above, the rod 124 is locked when amounts of transactions are entered. The movement of the differential device 127 to 134 caused by the machine drive is therefore transmitted to the rod 124', since, as will be set forth later on, the extension 122a is then out of the reach of the rods 124, 124'. Thus when the transaction amounts are entered, the pinion 103 is always in its initial position, and the drum cam 74 can be set correctly by the cam groove 92a.

For taking the new balance the add and subtract wheels are selected in the following manner:—

A drum cam 110 (Figs. 11b, 16, and 37) shiftably mounted on the shaft 109, is connected, for the purpose of common rotation, with the gear 638 by means of the gear 639 and the shaft 109, and operable through half a rotation at each transition of the add and subtract totalizer balance from the positive into the negative condition, or vice versa. The cam groove 110a (Fig. 16) of the drum cam 110 is engaged by a roller 111 fixed to a sleeve 112. The sleeve 112 is slidable on the sleeve 113, but the two sleeves are pinned (pins 114) together (Fig. 19), for the purpose of being commonly rotated. The said pins are secured to arms 115 of the sleeve 113 and guided in bores of arms 116 of the sleeve 112. As already mentioned, the sleeve 113 is shifted by the balance lever 4, that is, the said sleeve, when the lever is moved into the position "balance", will be positioned so that the arms 115 supporting the latching bar 119, are lowered. If, by entering the transaction amounts the sign in the add and subtract totalizer has been changed, the cam 110 has performed a rotation and thereby slid the sleeve 112 into the right or left hand terminal position corresponding to the respective add and subtract totalizer balance, the said sleeve, however, remaining coupled with the sleeve 113 for the purpose of common rotation. If the balance is a positive one, the locking arm 116a (Fig. 16) of the sleeve 112 when shifted, is opposite a locking wheel 141, and when the balance is a negative one, the locking arm 116b will face a locking wheel 142. The locking wheel 141 is rigidly connected to the bevel gear 130, and the locking wheel 142 to the bevel gear 134 of the differential gearing 129, 130, 134.

If the sleeve 113 and, in connection therewith also the sleeve 112, is, by means of the balance lever so rotated that the arms 115 have pulled the latch bar downward, the locking arm 116a, or 116b, is engaged with the locking wheel 141 or 142, according to the lateral setting of the sleeve 112. Thereby one of the two rods 124, 124' is locked, that is, the rearward rod 124 when the amount standing on the add and subtract totalizer is a positive one, and the forward rod 124' when the amount is a negative one. If the differential device 129, 130, 134 is actuated by the machine drive, only the rod 124 not locked is able to move. Hence the pinion 103 remains in rest position when the rearward rod 124 is arrested, but it is rocked with the forward rod 124' arrested. Correspondingly, through the drum 74, the pinion 65a is coupled either with the adding wheels 75, or with the subtract wheels 80. The differential gear 102 is when this occurs, held by means of the cam groove 92a in its rest position just as though the old balance is entered.

RETAINERS

The retainers are subdivided into several, for instance five, groups comprising ten retainers each (Fig. 2b). Each group is arranged within a frame 25 (see also Fig. 23) guided by rollers 26 fast on shafts 27 supported by the side walls 28. In the rearward rest position, each retainer group is yieldingly held by means of a spring tensioned lever 29 (Fig. 2b) provided with a roller 30 engaging a recess 31 in the frame 25. Fast in the frame 25 is a shaft 32 having shiftably mounted thereon side by side, in denominational order, the racks 33 of the ten retainers of one group (Figs. 22, 23). A locking rod 34 fast on the forward end of the frame 25, engages a recess in the upper teeth of each retainer rack, thus locking the racks in their respective settings. A second rod 35 fast in the frame 25, secures the position of the retainer racks from below.

All the retainer groups are arranged within a housing consisting of the side walls 28 and the shaft 27, which housing is enabled to be set, in vertical direction, to five different positions according to the number of retainer groups. The weight of said housing is balanced, in a well known manner, by a counter-weight not shown. The setting of the housing is effected by the retainer group keys 19.

In the group key bank 19 (Fig. 27) a differential device, similar to that in the amount key banks, is provided, by the actuating members 670, 671 of which a differential member 672 is differentiated according to the key 19 depressed at the time. The differential member 672 meshes with a gear 673 fast on a shaft 674 rotatably mounted in the machine. Further, the shaft 674 carries two gears 675 (Fig. 23), each one thereof being connected by means of intermediate gears 676, 677, and 678a, an intermediate shaft 678, and gears 678b and 679, with a gear 36 arranged, sidewardly from the retainer housing 28, in the machine. The gears 36 mesh with racks 37 secured on the retainer housing 28. By means of the connection set forth, the retainer group selected by the key 19, is brought in mid-position being its working position (Fig. 2b).

The retainer housing 28 is latched in its set position. In the plane of the rack 37, a latch 691 (Fig. 27) is pivoted on a stud 690 of the machine cabinet, the said latch having a locking nose enabled to engage recesses in the rack 37. The latch 691 has two recesses 693 to be entered by a pin 694 under the action of a spring 695 and to lock thereby the latch yieldingly in two different positions. Fast on a shaft 696 performing one rotation during each machine operation, is a cam disk 697 cooperating with a shoulder 98 of the latch 691, and moving the latter in each machine operation into its position latching the rack 37 and, in connection therewith, the vertical setting of the retainer housing; and this occurs at the time when the actuating means 670, 671 of the key bank 19 have reached their set positions according to the key depressed.

The keys 19, 20 selecting the retainers, are depressed in the first machine operation for recording the old balance, but released only at the end of the last machine operation for registration of the new balance. Releasing the keys is effected in any known manner and therefore it is not detailed herein. The release movement is also transferred to a shaft 699 carrying a cam disk 700 cooperating with an extension 701 of the latch 691 and moving the latter when the keys 19 are released, out of its locking position into its ineffective position wherein it is yieldingly held by the pin 694. By means of the latch 691, the retainer housing is locked in its set position during the entire cycle of posting operations.

While the retainer housing is vertically set, the retainer group selected by depressing one of the group keys 19, with its gear 38 fast on the forward shaft 27, is brought into the path of the teeth of a large gear 39 (Figs. 2b and 23), mounted upon a stationary stud 40 of the outer wall 81, which gear, due to a cut off portion of the gearing (Figs. 24, 25) does not interfere with the up and down movement of the totalizer housing.

Beside each of the gears 38 a locking disk 238 is secured, the flattened portions 238a of which disk are facing a locking rod 239, so that the shaft 27 carrying the gears 38 can not be moved at will. Only the shaft 27 of the selected retainer group is free to rotate, since in this case a recess 239a of the locking rod 239 is facing the locking disk 238, and permits the rotation of the locking disk 238 and, in connection therewith, also that of the shaft 27 of the selected retainer group.

After the vertical setting of the selected retainer group, the large gear 39 is driven in a manner set forth hereinafter, which gear shifts the selected retainer group in horizontal direction to the left (Figs. 2b and 24) by means of the gears 38 and 41 fast on the shaft 27 and the racks 42 fast on the retainer frame 25. In so doing, the racks 42 (see also Fig. 34) before being disconnected from the gears 41, come into mesh with the gears 43 fast on a shaft 44 and are driven by means of a second large gear 39a and a gear 38a till the retainer group is in its forward position, in which it is yieldingly held by a spring tensioned lever 45 provided with a roller (Fig. 2b).

On guiding pins 46 of the frame 25 is supported a second frame 47 (Figs. 2b, 22, 23, and 34) shiftable, relatively to frame 25, in vertical direction, but normally held by means of springs 48 in its upper position. A cross rod 49 fast on the forward end of the frame 47, engages from below the tooth heads of the adding racks 33. The beforementioned cross rod 35 and a further cross rod 50 are connected together by means of a pin and slot connection, so that the two cross rods 35 and 50 can be shifted commonly in horizontal direction, and vertically in opposite directions in slots of the two frames 25 and 47. The cross rod 34 is fast to the outer frame 25, and the cross rod 49 to the inner frame 47. The two cross rods 35 and 50 are horizontally shiftably arranged in the two frames. The two cross rods 49 and 50 are carried along during the downward movement of the inner frame 47 as will be set forth hereinafter.

When the selected retainer group is shifted in its forward position (Figs. 2b, 22, 23, and 34), wherein the frame 25 is guided by means of the guiding rollers 51, 52 of the shafts 44, 53, 54, 55, the guide roller 58 on the cross rod 35 comes in the path of two stepped setting members 59 and 60. A key bank 20 (Figs. 1 and 45) comprising nine keys and a zero stop pawl, is provided for the selection of the ten retainers "0" to "9" of each group. The differential device associated therewith, being like the amount differential, is not described in detail, but reference numerals like those used in describing the amount bank are used with a prime mark to differentiate them from the elements of the amount bank.

The differential member 22' (Fig. 45) is connected to the setting member 59 by a train of gears 205', 1205, and 2205, the latter meshing with rack 2305 fastened to the setting member 59. The other differential member, 21', is connected to the setting member 60 by the pair of gears 209', 1209, and a rack 2209 fastened to the setting member 60 and meshing with the gear 1209. Upon operation of the machine, the differential members 21' and 22', through the two trains of gears just described, move the setting members 59 and 60 like distances in opposite directions. In so doing, the slide roller 58 is scissor-likely embraced by the steps corresponding to the keys 20 depressed at the time, of the setting members 59 and 60, whereby the cross rods 35 and 50 are differentially positioned according to the key depressed. The movement of the actuating members connected to the setting members 59 and 60, starts, of course, only after the selected totalizer group as reached its forward position. The cross rod 50 is provided, in each denominational order, with an extension 50a, and the cross rod 35, opposite the extensions 50a, with a recess 35a (Figs. 2b and 22). While the cross rods 35 and 50 are shifted, the extensions 50a and the recesses 35a are set opposite the racks 33 of the retainer determined by the depressed key 20.

The inner frame 47 of each retainer group or row is provided on each side with a pin 61 engaged, when the selected retainer group moves forwardly, by the forked opening of a pulling rod 62 (Figs. 2b and 22). The pulling rods arranged on both sides, are, after the totalizer is selected, moved downwardly, as will be described later on, by means of a cam disk 63 each and, in so doing, they carry along the inner frame 47 of the totalizer group together with the cross rods 49 and 50. Thereby, the extensions 50a press downward the adding racks 33 of the selected retainer, the said racks, thus, being brought in mesh with the coupling pinions 65.

In the same manner as the racks 33, the beforementioned rods 122 (Fig. 19) representing the sign of the amount standing on the retainer, are mounted in the retainer frames 25 and 47, that is, in each retainer group or row ten rods 122 appropriate to each one of the retainers of this group, are located side by side at the left hand side of the highest denominational order (Figs. 22, 23). The rods and the appropriate retainers are selected together by means of recesses 35a and extensions 50a of the cross rods 35, 50. In the rest position, the rods 122 are arrested in one of their two positions (positive or negative amount) by means of the cross rod 34. While the inner frame 47 is moved downwardly, the rod 122 appropriate to the selected retainer, is moved out of the reach of the cross rods 34 and, during the machine operations for the old balance, locked, as beforementioned, by the locking bar 119, whereas its extensions 112a come into the reach of the rods 124, 124'.

TOTAL TAKING

Total taking from the totalizers of rows I to III is effected similarly as specified in U. S. A. Patent No. 1,899,455, so that it is deemed sufficient, to set forth briefly hereinafter total taking only from the add and subtract totalizer of row I (Figs. 2a, 2b and 28).

On a shaft 710' are fastened plates 711' carrying the total taking shaft 467'. The shaft 467' has provided thereon, for each denominational order, a groove having mounted therein a total taking counter-tooth 713'. Further, for each denominational order of the machine, shaft 467' supports a sleeve 714' embracing by means of a slot the total counter-tooth 713' and having an arm 715' connected by means of a link 716' to a two-armed lever 717', 718' loosely mounted on the shaft 710', which lever, normally, bears against a stationary rod 719', whereas its working surface 720' is in contact with a stud 721' of a rod 722 arranged beside the amount differential rack 23 of the respective denominational order. The rods 722 one thereof being provided in each order, are provided with a stud 721', 721'', and 721''', each for each one of the totalizer rows I to III, the said stud being connected by means of the levers 717', 718', in the manner set forth, to the respective total counter-tooth 713'. The rods 722 have extensions 723 cooperating with rollers 724 of actuating disks 725, numbered "81" in Fig. 1 of the U. S. Patent No. 1,899,455.

During each machine operation, the shaft 710' is rocked, so that the total counter-teeth 713', while the amount differential members 21, 22 are closed, are moved downwardly into the reach of the adding wheels. At adding operations, however, the totalizers are just in their rocked positions, so that the total counter-teeth can not affect the adding wheels. At total taking operations, however, the totalizers are rocked inwardly, while the amount differential members are closed, so that they become connected to the amount differential wheels. In so doing, they come into the reach of the total counter-teeth. When an adding wheel was standing at zero, or when it was set to zero during the total taking action, the tens tooth 301a rotates the tens counter-tooth, and through the connection 714' to 724 the actuator 725 counter-clockwisely. Thereby the dislocation being necessary for total taking of the locking means not shown herein, but fully disclosed in the U. S. Patent No. 1,899,455, between the main differential member 22 and the auxiliary differential member 21 is performed.

At total taking the selection of the add or subtract wheels is effected, as before mentioned, by means of the key stems 15 or 16. By means of sliding the plate 466 (Fig. 3b) and sliding the total taking shaft 467''' effected thereby, also the total counter-teeth 713' are set to the wheels selected at the time, of the add and subtract totalizer. Selecting the adding wheels in the totalizer rows II and III is effected also by means of the plates 466 (Fig. 9) and the total taking shaft 467'''. Setting the plates 466 may be effected in any known manner, for instance, in row II by a totalizer lever 3, or in row III by the key 17, and is not specified here as not pertaining to the invention disclosed.

The total is taken from the add and subtract totalizer of the row IV in the following manner:—

To the balance lever 4 (Fig. 10) is connected by means of a link 829 a segment 827 fast on a shaft 828. The shaft 828 also carries an arm 730 connected by means of a link 731 to an arm 732 fast on a shaft 733. The shaft 733 has, in each denominational order, secured thereon a cam disk 734 (Fig. 12) having a cam 734a engaging from below the rearward arm of the pawl 870 when the balance lever 4 is set, and converting thereby the yielding locking of the gear 607 and, in connection therewith, the tens transfer means 601 into a rigid one.

The shaft 740 (Fig. 2a) rotatably and shiftably arranged in the machine, and performing one revolution during each machine operation, has fixed thereto, in the first denominational order, a control disk 741 provided with a groove 742 able to be engaged by the roller 743 of a lever 744 fast on a shaft 745. During adding machine operations, the shaft 740 with the control disk 741 thereon is positioned sidewardly, so that the roller 743 does not engage the curved groove 742. In balancing operations, however, the shaft 740 is slid in axial direction, as will be disclosed later on, so far that the roller enters the curved groove 742 being widened at the point opposite the roller 743 when in rest position, in such a way that safe entering of the roller is possible. In each denominational order the shaft 745 has fixed thereto a lever 744 differing from that provided in the first denominational order, only in that it does not carry a roller 743.

Each lever 744 guided in a slotted plate 760, has linked thereto a rod 747 connected so as to be slid longitudinally, by means of two pin and slot connections to a rod 749. Between an extension 748 of the rod 747 and an extension 750 of the rod 749 a spring 753 is arranged. The rod 749 has linked thereto an arm 754 loosely mounted on a shaft 756, the said arm being provided with a toothed segment 755. This segment is in mesh with a gear 757 on a shaft 758, the said gear being connected to a gear segment 759 meshing with a set to zero rack 145.

The set to zero rack has teeth 145a which, normally, are not in mesh with the coupling pinion 65. But, when during total taking the lever 744 is lifted by means of the cam groove 742, also the set to zero rack 745 is raised, by means of the parts 747 to 759, brought in mesh with the coupling pinion 65 rotating it and the add or subtract wheel of the add and subtract totalizer IV connected therewith, in the direction opposite to the add direction, till the tens tooth 603 strikes one of the teeth arrested as before mentioned, of the tens transfer member 601. Thereby the add or subtract wheel has been reset to zero, and the set to zero rack 145 as well as the gearing 759 to 749 are arrested. The stroke of the curved groove 742 is of such an extent that the set to zero rack is able to return the wheels of the add and subtract totalizer by nine units. If the resetting rod is stopped previously by means of the tens tooth, that is if the respective wheel of the add and subtract totalizer is in the "0" position before the reset rack has completed its full stroke, the remainder of the movement caused by the raceway 742 is absorbed by the spring 753, whereat the rod 747 slides on the rod 749.

Upon resetting the add and subtract totalizer of row IV the total standing thereon, is transferred to a retainer. For this purpose the selected retainer is, by means of pulling down the inner frame 47, brought in mesh with the coupling pinions 65, and held in mesh therewith while the wheels of the add and subtract totalizer are reset to zero. But it is still necessary to transmit the sign of the add and subtract totalizer balance to the retainer. As already disclosed, one of the rods 124, 124', according to the sign of the new balance, is arrested upon resetting the add and subtract totalizer IV. Besides, the lug 122a of the rod 122 appropriate to the selected retainer, upon pulling down the inner frame 47 is brought into the reach of the rods 124, 124'. When, now, the tongs are closed, they position the rod 122 according to the position of the arrested rod 124, or 124' respectively, whereby the sign of the new balance on the retainer is determined. The locking bar 119 is brought into its lower position by means of the balance lever 4 when moved to balance position prior to the resetting operation and at the same time that the locking arms 116a, 116b are rocked, in which position the said bar 119 does not interfere with the displacing of the rod 122.

The reset racks 145, when returning to initial position, are not allowed to rotate the add or subtract wheels of the add and subtract totalizer IV out of their zero positions. In this case, therefore, the coupling between the racks 145 and the coupling pinions 65 has to be interrupted. For this object the coupling pinions 65 are slid in longitudinal direction so far to the left (Figs. 11a, 11b) beyond the subtract position, till a mutilated portion 65b of the said pinions faces the reset racks 145. Thus the reutrn movement of the racks 145 does not affect the coupling pinions 65.

As already disclosed, the coupling pinions 65 are slid by the raceway 74a by means of the plate 71 (Fig. 32) for selecting the add or subtract wheels of the add and subtract totalizer IV. The plate 71 is connected to the shaft 66 by means of a pin 901 and a longitudinal slot of a hub 71a fast on the plate 71. Between a disk 900 located before the pin 901, and the plate 71 a spring 902 is stretched, trying to hold the pin 901 in engagement with the left hand end of the slot. Fast on the left hand end of the shaft 66 is an arm carrying a roller 904 bearing against the curve-likely formed front side of a disk 907 when the shaft 66 is in its left hand end position (coupling of the adding wheels). During each machine operation the disk 907 performs a full revolution and in doing so it moves, by means of its cam 907a, at the end of the machine operation the shaft 66 against the action of the spring 902 in that position in which the coupling pinions 65 are out of mesh with the reset racks 145, regardless of whether the coupling pinions 65 are in their add or subtract position. When the reset racks are returned to normal position, the cam 907a frees the roller 904 again, so that the shaft 66 may regain its normal position too.

For resetting the retainers the following arrangement is made:—

The shaft 54, slidably supported by the intermediate walls 81, 82 (Figs. 2b and 23) has secured thereto a gear 83 meshing with a broad gear 84 to which is imparted at certain times of the machine operation, in a way set forth later on, an oscillatory movement. Further, on the shaft 54 is rotatably, but unshiftably, mounted an arm 85 secured by a stationary bolt 1851 against rocking and provided with a roller 86 engaging the groove 87a of a groove drum 87 rotated in selecting the retainers so that the shaft 54 is slid according to the depressed key 20 by means of the shape of the groove. As before mentioned, the differential member 21' (Fig. 45) is adjusted according to which key 20 is depressed, and the differential member is connected to a gear 1209 (see also Fig. 47), so that the gear 1209 is adjusted to a position controlled by the depressed key 20. This differential movement is transmitted to the drum 87 by a train of gears including gears 950, 951, 952, 953, and 954, the latter being connected to the gear 1209 by a sleeve 955. The gears 951, 952, and 953 are rotatably mounted on studs 956, 957, and 958, respectively, carried on the side frame 82. Through this gear train, the drum 87 is differentially rotated to shift the arm 85 and shaft 54, together with the reset arms 88, into the plane of the retainer racks 33 which are to be reset. During the first portion of the oscillatory movement of the shaft 54 the reset arms 88 are rocked counter-clockwisely (Fig. 2b) to engage the right ends of the racks 33 of the selected retainer to slide them to the left into their zero positions. Thereby the balance on this retainer is transferred to the coupling pinions 65 and to the add and subtract wheels of the add and subtract totalizer of the row IV coupled with said pinions.

MODE OF OPERATION CONTROL

The movement of all machine operated parts is derived from the main shaft 201 (Fig. 2a) performing a full rotation during each machine operation, which main shaft may be driven manually or by a motor in any known manner. The variety of the sequences of machine operations following each other which is caused by the different modes of machine operations (adding, total taking), is controlled by the mode of operation lever 5, the balance lever 4, and, partly, also by the totalizer keys. In connection with the totalizer rows I, II and III such a control is broadly detailed in the U. S. A. Patent No. 2,052,444 to which reference may be had for a detailed description thereof.

For the add and subtract totalizer of row IV and for the retainers the following mode of operation control means are provided:—

Through an intermediate gearing described later on, the main shaft 201 is connected to a control shaft 800 (Figs. 15, 29, 31) also performing one revolution during each machine operation and able to be slid longitudinally into three different positions. On the shaft 800, between two set collars 801, 802 (Fig. 29), is rotatably mounted a sleeve 803 having a forked arm 804 embracing a stationary shaft 805, and being provided with two studs 806, 813 (Fig. 10). The latter cooperate with two grooves 807a, 808a of two drums 807, 808.

The drum 807 is mounted on a shaft 809 and rigidly connected to a gear 810 (Fig. 29) meshing with teeth 811 of a rack 812. The rack 812 is, by means of elongated slots, mounted on shafts 805 and 815 (Fig. 15) and its teeth 816 mesh with teeth 817 of a bell crank lever 818 loosely mounted on the shaft 94 and acted upon by a spring 819 to be rotated clockwisely. An elongated slot of the bell crank lever 818 engages a stud 820 of a key detent 821 having beveled surfaces 822 cooperating with pins 823 of the keys 11 and 12. If one of these keys is depressed, the key detent 821 is moved upwardly, the bell crank lever 818 is clockwisely rotated against the action of the spring 819, and the rack 812 pulled to the left. Thereby the drum 807 receives a clockwise rotation. At the end of the machine operation, when the key is released, the displaced parts are restored to normal position by means of the spring 819.

The drum 808 (Fig. 10) is mounted on a shaft 825 and rigidly connected to a gear 826 meshing with a gear segment 827 on a shaft 828. The gear segment is, by means of a link 829, connected to the total or balance lever 4. When the balance lever is set to "Balance", the drum 808 is clockwisely rotated, through the beforementioned connection, and restored to its initial position when the balance lever is set to "adding".

The grooves 807a and 808a in the drums 807 and 808 are so shaped that the control shaft 800 is in its mid-position when the drums 807 and 808 are in normal positions (Fig. 29). When one of the keys 11 or 12 causes the drum 807 to rotate, the control shaft 800 is, by means of the groove 807a, moved into its right hand end position and, when the drum 808 is rotated by the balance lever 4, into the left hand end position by means of the groove 808a. Rotating both the drums, at the same time, does not occur. Fig. 30 shows the evolutions of the grooves, i. e., with the shaft 800 in mid-position. If the drum 807 is rotated, the groove 807a slides the stud 806 to the right and disengages the stud 813 and the groove 808a. If, however, the drum 808 is rotated, the groove 808a slides the stud 813 to the left and disengages the stud 806 from the groove 807a.

The keys 11 and 12 are depressed in entering the old balances, the balance lever 4 is moved to total taking, whereas, in entering the deposits or withdrawals, the said setting means remain in their respective initial positions. Accordingly, during the old balance machine operations, the control shaft 800 is in the right hand end position, for the transaction machine operations it is in mid-position, and during the new balance machine operations in left hand end position.

Fast on the control shaft 800 (Fig. 29) is a gear 832 which is shiftable together with the said shaft. The shaft 833 has arranged thereon two gears 834 and 835 and, in addition thereto, the two grooved disks 63 (Fig. 22). If the control shaft 800 is in right hand end position, the gear 832 and the gear 834 mesh, and, when the shaft is in its left hand end position, then the gear 835 and the gear 832 mesh, whereas said gear 832, when the shaft is in mid-position, does not mesh with any of the gears 834 or 835. The cam disks 63 by means of which the retainers are engaged with the pinions 65, are driven only during the old and new balance machine operations.

Unshiftably mounted on a shaft 839 is a gear 838 (Fig. 29) connected by intermediate gears 840 to 842 (Fig. 15) with the cam disk 69. The gear 838 meshes with a gear 837 (Fig. 29) on the control shaft 800 when the latter is in mid-position. A like connection is provided between the control shaft 800 and the other cam disk 69. The cam disks 69 serving for coupling the add and subtract totalizer IV with the amount differential racks 23, are, thus, driven only in transaction entering machine operations.

Further, the control shaft 800 has secured thereto two gears 846 and 847 (Fig. 31) arranged tightly side by side and provided with mutilated toothings. When the shaft 800 is in its right hand end position, the gear 846 is within the reach of a gear 848, and, when the said shaft is in its left hand end position, the gear 847 is within the reach of a gear 849, whereas, when the said shaft is in the shown mid-position, the gears 846 and 847 do not mesh with the gears 848 and 849 respectively. The gears 848 and 849 are, by means of intermediate gears 851, 853 and 854 as well as by the intermediate gears 850, 852, 853 and 854, connected to the large gears 39 and 39a. The train of gears beginning with gear 849, comprises one intermediate gear more than the other train.

When, in an old balance machine operation (shaft 800 in right hand end position) the control shaft 890 is driven, the gear 846 comes, at the proper time, in mesh with the gear 848 actuating thereby the large gears 39 and 39a and advancing the selected retainer group. In taking the new balance, at the end of the machine operation, the gear 847 comes in mesh with the gear 849 whereby the large gears 39 and 39a are driven in opposite directions, restoring the retainer groups to their rearward positions. To ensure a smooth engagement of the mutilated toothings of the gears 846, 847 with the gears 848, 849, a spring actuated pawl 855 is provided, yieldingly locking the last mentioned gears in their positions corresponding to the forward and rearward positions of the retainer groups.

When the total (the new balance) is to be taken from the add and subtract totalizer IV, the shaft 740 (Figs. 2a and 10a) together with the cam disk 741 has to be shifted so that the roller 743 enters the groove 742. For this purpose the shaft 740 has mounted thereon, between two collars 880, a sleeve 881 (Figs. 10 and 10a) secured against rotation by an arm 882 extending over a stationary rod 883. The sleeve 881 is provided with a roller 884 engaging the groove 885b of a drum 885a. The drum 885a is rotatably mounted on a shaft 886 and rigidly connected to an arm 887 connected, by means of a link 888, to the balance lever 4. The groove 885b is so shaped that the roller 743 is withdrawn from the groove 742 when the balance lever is set to "adding", but the roller 743 is again entered into the groove 742, when the balance lever is set to "balance". Thus, when the lever 4 is in "add" position, the mechanism shown in Fig. 2a is not actuated by cam 741, even though this cam is rotated by the shaft 740. When the lever 4 is in "balance" position, this mechanism is operated by cam 741 in the manner hereinbefore described.

The main shaft 201 rotating performing one revolution once in each machine operation, is provided with a bevel gear 909 (Fig. 33) meshing with a bevel gear 910 on shaft 911. The other end of the shaft 911 (Figs. 10 and 10a) has attached thereto a bevel gear 912 meshing with a bevel gear 913 keyed to shaft 740 as shown in Fig. 10a. The ratio of gearing between the bevel wheels is such that also the shaft 740 actuating the zeroizing mechanism of the add and subtract totalizer IV performs one revolution during each machine operation. Rotation of shaft 740 rotates cam 741 (Fig. 10) during every operation of the machine, but the effectiveness of the cam to actuate the lever 744 and its connected elements depends on the relative position of the cam race 742 and roller 743, as above described.

Further, the main shaft 201 has secured thereto a gear 914 (Fig. 33) driving over an intermediate wheel 915 a gear 916 by means of which the shaft 905 is given a single revolution. The shaft 905 serves, as before mentioned, to slide the coupling pinions 65 in their utmost left hand position (Figs. 11a, 11b). The gear 916 has rigidly connected thereto a gear 917 (Fig. 33) meshing with a gear 918 on a shaft 940. Further, on the shaft 940 are arranged a toothed disk 941 and a locking disk 942 meshing with a toothed disk 943 and a locking disk 944, fixed to the shaft 55, which serves for the tens transfer in the add and subtract totalizer IV and thus rotates twice at the end of each machine operation.

Further, the gear 916 meshes with an intermediate gear 920 meshing, in its turn, with a gear 921 fast on the control shaft 800 serving to control the mode of operation of the add and subtract totalizer IV and the retainers. The gear 921 drives over a gear 922 a cam disk 923 the groove 923a thereof being engaged by a roller 924 of a pitman 925 having its upper end linked to an arm 926 of shaft 70. The groove 923a is so formed that the shaft 70, in the second half of the machine operation, is given an oscillatory movement by means of which the tongs 124, 124' are actuated.

The gear 921 drives a gear 927 and this gears another cam disk 928 having a groove 928a engaged by the roller 929 of a pitman 930. An arm 931 connects the pitman to the gear 932 meshing with a gear 933 on shaft 54. Through the said chain of gearing the shaft 54 and, in connection therewith, to the reset arms 88 is imparted an oscillatory movement near the middle of the machine operation. The gear 915 is connected to a bevel gear 934 driving the shaft 696 which actuates, by means of the parts 935 to 938 the latch 691.

OPERATION

In order to explain the operation of the machine it may be assumed that a customer keeps an account with the savings bank using a machine as disclosed heretofore, the account showing a balance of $100.— in his favor. This amount appears on his ledger card as the last new balance. Now, the customer will withdraw $50.— from his balance, which amount has to be recorded also on a transaction account (for instance on the retainer No. C8).

*I. Entering the old balances*

The clerk sets up first the old balance viz. $100.— on the amount keys. Then he depresses the key C in row 19 and key 8 in row 20 to select the retainer No. C8, and by depressing the key 11 he selects the auxiliary totalizer "AC" for the old balances in the totalizer row II. By depressing the key 11, at the same time, the positive side of the add and subtract totalizer I is selected, and the drive for advancing the selected retainer as well as the drive for engaging the retainer with the pinions 65 is coupled.

When by depressing the motor key 18 the machine is released for operation, the differentials in the key banks 10, 19, and 11 to 16 are differentially set under control of the respective depressed keys, they position the amount differential racks 23 to the amount set up, the retainer housing in the third (middle) position, and the drum 512 (Fig. 9) for actuating the auxiliary totalizer AC. Thereupon the retainer housing is fixed in its position by means of the latch 691 (Fig. 27), and the selected third retainer group "C" is moved by the gears 39, 39a into the front position. At the same time the add and subtract totalizer I as well as the auxiliary totalizer "AC" have been brought in engagement with the amount differential racks 23.

After the third retainer group has reached its front position, the actuating members in key bank 20 start their movements, whereby the extensions 50a, the recesses 35a, and the reset arms 88 are set to the ninth retainer of this group, i. e., retainer No. C8. Thereupon all the actuators displaced return to their rest positions, the set amount of $100.— being transferred to the add and subtract totalizer I and the auxiliary totalizer AC. At the same time the retainer No. C8 has been meshed with the broad pinions 65, and the appropriate rack 122 representing the sign with the locking bar 119.

Assume that on the retainer No. C8 a positive amount of $10,000.— has been accumulated. The rod 122 of this retainer is then in its rearward (positive) position. Since the gear 102 of the differential 102 to 104 is locked by the groove 92a, the rod 122 proper is in its rearward, i. e., positive position, and thus the adding wheels 75 of the add and subtract totalizer IV are selected by means of the tongs 124, 124'. Since the pinions 65 (and the parts to be shifted therewith simultaneously) are, normally, so positioned that they mesh with the adding wheels 75, no shifting is effected by closing the tongs 124, 124'. Such a shifting occurs only when the rod 122 is in its forward, i. e., negative position, that means, when the amount on the retainer would be a negative one. At the same time also the add and subtract totalizer I and the auxiliary totalizer "AC" is disengaged from the amount differential racks 23.

Thereupon the reset arms 88 rock forwardly and reset the retainer No. C8, the amount of $10,000.— accumulated thereon, being transferred to the adding wheels 75 of the add and subtract totalizer IV. During the last period of the machine operation, the reset arms 88 return to their initial positions, whereupon the retainer No. C8 is lifted and thereby disengaged from the pinions 65. Besides, the tongs 124, 124' are opened.

II. Entering transactions

The amount of the transaction (withdrawal of $50.—) is set up on the amount keys, key "Ab" (14) and the motor key 18 are depressed. By depressing the key "Ab", the locking finger 668 (Fig. 15) is moved into the recess 669a of the disk 669 and thereby the shaft 68 and the pinion 103 are locked. The machine operation is performed first like the one previously described, that means, the amount differential members are differentiated to the amount of the transaction, the actuators of the auxiliary totalizer key bank select the totalizer "Ab", and the differential members in the retainer key banks 19, 20 are set again to the keys "C" and "8" still in depressed position, which, however, is without any effect, since the retainer No. C8 is still in its set position.

As the transaction is a withdrawal, the amount has to be transferred to the subtract wheels of the add and subtract totalizers. In connection with the add and subtract totalizer I, this occurs in the same manner as in the first machine operation, however, the negative side is selected by the key 14 together with the control totalizer "Ab". In connection with the add and subtract totalizer IV, the grooved drum 74 is rotated, by means of the groove 92a set by the key 14, and the gear 102 and the arrested pinion 103, so that the pinions 65 are meshed with the subtract wheels 80.

In this machine operation the retainer group rests in its front position, also the actuator for latching the retainer housing remains ineffective, as the latch 691 has not yet been restored into its rest position. After the engagement of the add and subtract totalizer I, the special totalizer, and the add and subtract totalizer IV with the amount differential racks 23 by means of the pinions 65, the amount of the withdrawal is transferred to the said totalizers, during the now started restoration of the amount differential members, causing also, if necessary, tens transferring. Closing the tongs 124, 124' has no effect in this machine operation, as the retainer No. C8 and, in connection therewith, its slide 122 is not engaged, also the reset arms 88 remain ineffective, since the racks 33 of the selected retainer are still in their positions whereto they were set during the previous machine operation.

III. Taking the new balance

The operator sets the balance lever 4 to the "balance" position and depresses the motor key 18. During the machine operation released thereby, first the add and subtract totalizer I is engaged with the amount differential racks 23 and reset by said racks. It comes into the reach of the tens counter-teeth 713 (Fig. 28) thrown in at this time, during each machine operation, the said teeth being otherwise ineffective. Thereupon, into the special totalizer "NC" selected by the motor key and the differential members of the special key bank engaging the amount differential racks 23, the new balance of $50.— computed in the add and subtract totalizer I, is entered during the now following restoration of the amount differential racks 23. The differential members appropriate to key banks 19 and 20 are ineffective also in this machine operation.

Now, the retainer No. C8 is brought in engagement with the pinions 65, and the side of the add and subtract totalizer IV is selected, from which the new balance is to be taken. In the example, this amount is positive, viz. $10,000.— minus $50.—=$9,950.—, wherefore the adding wheels 75 are engaged with the pinions 65a. This occurs according to the setting of the groove drum 110 (Fig. 16) which, already in the preceding machine operation, has been positioned correspondingly to the positive sign of the add and subtract totalizer amount, and which has placed the locking arm 116a in front of the gear 141. By moving the balance lever, this arm has been engaged with the said gear whereby the rear rod 124 now in connection with the pinion 103, of the tongs 124, 124' is locked. Since also the gear 102 is locked by the groove 92a, no movement of the drum 74 takes place, and the pinions 65 remain in their initial positions allotted to the adding wheels 75. Upon closing the tongs 124, 124', the rod 122 remains, in this case, in its rear position, since the sign of the amount on the retainer has not been altered.

If the amount on the retainer would have been grown to a negative one, the control drum 110 had been actuated through the highest order of the add and subtract totalizer IV, and it had set the locking arm 116b opposite the gear 142 (Fig. 16). Upon moving the balance lever, this gear and, in connection therewith, the front rod 124' of the tongs 124, 124' would have been locked. Upon closing the tongs, the rear rod 124 thereof would have been moved forwardly, shifting thereby the pinions 65, by means of the drum 74, so that they would have been in mesh with the subtract wheels 80. At the same time, the tongs had positioned also the rod 122 so as to represent the negative sign of the amount on the retainer. The latching bar 119 does not prevent this shifting as it would have been moved into its lower position upon moving the balance lever.

Now, the reset arms 88 the advance of which has been ineffective just so as during the previous machine operation, return into their rest positions and give way for the retainer racks 33. During this return movement the set to zero mechanism 741 to 759 (Fig. 2a) is actuated and meshed with the pinions 65. The balance lever causes also the locking pawls 870 to be locked after engaging the gears 607 (Fig. 12). The adding wheels 75 are, now, by means of the zeroizing mechanism, returned so far till their tens teeth 603 strike the teeth of the arrested tens transfer members 602 and thus set to zero, thereby being totaled, i. e., the total also is printed with the correct sign. Thereby the add and subtract totalizer IV is reset and the amount of $9,950.— accumulated thereon, transferred to the retainer No. C8.

After the zeroizing device has completed its forward movement, the pinions 65 are sidewardly moved out of its plane and, besides, the retainer is disengaged. The zeroizing device returns to rest position without affecting the add and subtract totalizer IV. Further, the selected retainer group is returned into the retainer housing, whereafter the housing is freed of its locking simultaneously with releasing the keys 19 and 20. Owing to the counter-weight the retainer housing remains at the level previously set to. Finally, the pinions 65 are restored into their initial positions.

If the total of more deposits or withdrawals is to be found, in each of these registrations the key "Su" has to be depressed. By this the itemizer of the totalizer row III is selected and coupled with the amount differential racks 23 in the same manner as it is done in connection with the special totalizers.

While the forms of mechanism herein shown and described are admirably adapted to fulfill the objects primarily stated, it is to be understood that it is not intended to confine the invention to the forms of embodiment herein disclosed, for it is susceptible of embodiment in various forms all coming within the scope of the claims which follow.

What is claimed as new is:

1. In a machine of the class described, an add and subtract totalizer, several rows of retaining devices consisting of shiftable racks adapted to receive positive or negative amounts, means for selecting any row of retaining devices, means for selecting any retaining device in the selected row, means for moving the selected retaining device into cooperative relation with said add and substract totalizer, means for engaging the selected retaining device with the add and subtract totalizer, and means associated with the selected retaining device adapted to select the add or subtract wheels of the add and subtract totalizer according to the sign of the amount standing on the selected retaining device.

2. In a machine of the class described, provided with retaining devices, an add and subtract totalizer provided in each denominational order with an add and a subtract wheel reversely interconnected with one another, means for selecting any retaining device, means arranged in and for each of said retaining devices, for signifying the sign of the amount standing thereon, means for engaging the selected retaining device with the add and subtract totalizer, and means controlled by said signifying means for selecting the add or subtract wheels of the add and subtract totalizer according to the sign of the amount standing on the selected retaining device.

3. In a machine of the class described, an add and subtract totalizer provided in each denominational order with an add and a subtract wheel reversely interconnected with one another, a row of retaining devices, means for selecting a retaining device in said row, means associated with each retaining device for signifying the sign of the amount standng on each retaining device, means for engaging the selected retaining device with the add and subtract totalizer, and means for selecting the add or substract wheels of the totalizer, said signifying means adapted to control the means for selecting the add or subtract wheels of the add and subtract totalizer according to the sign of the amount standing on the selected retaining device.

4. In an accounting or the like machine comprising interspersed retaining devices, an add and subtract totalizer provided in each denominational order with an add and a subtract wheel reversely interconnected with one another, a selecting device for said add and subtract totalizer, an amount key board, special key means controlled by the special key for selecting a retaining device, means for signifying the sign of the amount standing on each of said retaining devices, a differential mechanism common to the add and subtract totalizer and to the retaining devices, and a special setting member associated with each retaining device and actuated by said differential mechanism, said setting member adapted to select the add and the subtract wheels of the add and subtract totalizer according to the sign of an amount entered on the retaining devices in deposit and withdrawal entering machine operations.

5. In a machine of the class described, the combination of interspersed retaining devices consisting of shiftable racks, an add and subtract totalizer provided in each denominational order with an add and a subtract wheel reversely interconnected with one another, a totaling device for said add and subtract totalizer, an amount key bank, special keys, means controlled by the special keys, for selecting a retaining device, means for signifying the sign of the amount standing on each of said retaining devices, said retaining device selecting means adapted to select the signifying means appropriate to the selected retaining device, a differential mechanism, a special setting member in said differential mechanism, and means actuated by the add and subtract totaling device for controlling the engagement of the selected retaining device with the add and subtract totalizer by means of said special setting member, said special setting member enabled to set the signifying means appropriate to the selected retaining device according to the sign of the total computed by the add and subtract totalizer in balancing machine operations.

6. In a machine of the class described, the combination of interspersed retaining devices consisting of shiftable racks, an add and subtract totalizer provided in each denominational order with an add and a subtract wheel reversely interconnected with one another, overdraft mechanism in said add and subtract totalizer cooperating with the add and subtract wheels, a total control device for said add and subtract totalizer, an amount key bank, special keys, means controlled by the special keys for selecting a retaining device, means for signifying the sign of the amount standing on each of said retaining devices, said retaining device selecting means adapted to select the signifying means appropriate to the selected retaining device, a differential mechanism, a special setting member in said differential mechanism, and means actuated by the add and subtract total control device for controlling the engagement of the selected retaining device with the add and subtract totalizer by means of said special setting member, said special setting member enabled to set, in cooperation with the said overdraft mechanism, the signifying means appropriate to the selected retaining device according to the sign of the total computed by the add and subtract totalizer in balancing machine operations.

7. In a machine of the class described, the combination of interspersed retaining devices consisting of shiftable racks, an add and subtract totalizer provided in each denominational order with an add and a subtract wheel reversely interconnected with one another, an overdraft mechanism in said add and subtract totalizer cooperating with the add and subtract wheels, a total control device for said totalizer, an amount key board, special keys, means controlled by the special keys for selecting a retaining device, means for signifying the sign of the amount standing on each of said retaining devices, the signifying means combined into one group, said retaining device selecting means adapted to select the signifying means appropriate to the selected retaining device, a differential mechanism, a special setting member in said differential mechanism, and means actuated by the add and subtract total control device for controlling the engagement of the selected retaining device with the add and subtract totalizer, by means of said special setting member, said special setting member enabled to set, in cooperation with the said overdraft mechanism, the signifying means appropriate to the selected retaining device according to the sign of the total computed by the add and subtract totalizer in balancing machine operations.

8. In a machine of the class described, the combination of interspersed retaining devices consisting of shiftable racks, an add and subtract totalizer provided in each denominational order with an add and a subtract wheel reversely interconnected with one another, an overdraft mechanism in said add and subtract totalizer cooperating with the add and subtract wheels, a total control device for said totalizer, an amount key board, special keys, means controlled by the special keys for selecting a retaining device, means for signifying the sign of the amount standing on each of said retaining devices, the signifying means combined in a group, said retaining device selecting means adapted to select the signifying means appropriate to the selected retaining device, a differential mechanism, a special setting member in said differential mechanism, and means actuated by the add and subtract total control device for controlling the engagement of the selected retaining device with the add and subtract totalizer by means of said special setting member, said special setting member enabled to set, in cooperation with the said overdraft mechanism, the signifying means appropriate to the selected retaining device according to the sign of the total computed by the add and subtract totalizer in balancing machine operations.

9. In a machine of the class described, an add and subtract totalizer, several rows of retaining devices, a housing for said rows of retaining devices, means for differentially moving said housing to select a row of retaining devices, means for moving the selected row of retaining devices out of the housing and into cooperative relation with the totalizer, means for selecting any retaining device in said selected row, and means for engaging the selected retaining device with said add and subtract totalizer.

10. In a machine of the class described, an add and subtract totalizer, several rows of interspersed retaining devices consisting of shiftable racks, a housing for said rows of retaining devices, means for moving said housing to select a row of retaining devices, means for controlling the movement of the housing, means for moving the selected row of retaining devices out of the housing into cooperative relation with said add and subtract totalizer and back again, and means for selecting any retaining device in said selected row.

11. In a machine of the class described, an add and subtract totalizer, several rows of interspersed retaining devices consisting of shiftable racks, a housing for said rows of retaining devices, means for moving said housing to select a row of retaining devices, means for moving the selected row of retaining devices out of the housing into cooperative relation with said add and subtract totalizer and back again, means for selecting any retaining device in said selected row, and means for engaging the racks of the selected retaining device with the add and subtract totalizer.

12. In a machine of the class described, an add and subtract totalizer, several rows of interspersed retaining devices consisting of shiftable racks, a differentially movable housing for the several rows of interspersed retaining devices, means for differentially shifting the housing for selecting any row of retaining devices, means for selecting any retaining device in the selected row, and means for moving the selected retaining device into cooperative relation with said add and subtract totalizer.

13. In a machine of the class described, the combination of a retaining device adapted to receive amounts, a settable member associated with the retaining device, an add and subtract totalizer, and a differential mechanism including complementary movable members controlled by the add and subtract totalizer to adjust the settable member according to the sign of the algebraic balance in the totalizer.

14. In a machine of the class described, the combination of a retaining device adapted to receive amounts, a settable member associated with the retaining device, an add and subtract totalizer, a controlling device having a positive and a negative position of adjustment, connections between the totalizer and the controlling device to adjust the controlling device as the algebraic condition of the totalizer changes, a differential including complementary movable members, planetary gear means to actuate the differental, and locking arms on the controlling device to arrest one element of the planetary gearing to control the movement of the differential in accordance with the positive or negative state of the totalizer, whereby the differential adjusts the settable member according to the sign of the algebraic balance of the totalizer.

ERNST BREITLING.
HANS SCHWENK.